US009943996B2

(12) United States Patent
Chen et al.

(10) Patent No.: US 9,943,996 B2
(45) Date of Patent: Apr. 17, 2018

(54) PROCESS PLANNING OF MENISCUS SHAPES FOR FABRICATING SMOOTH SURFACES IN MASK IMAGE PROJECTION BASED ADDITIVE MANUFACTURING

(71) Applicants: Yong Chen, Burbank, CA (US); Yayue Pan, Los Angeles, CA (US)

(72) Inventors: Yong Chen, Burbank, CA (US); Yayue Pan, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 604 days.

(21) Appl. No.: 13/900,455

(22) Filed: May 22, 2013

(65) Prior Publication Data

US 2013/0313756 A1   Nov. 28, 2013

Related U.S. Application Data

(60) Provisional application No. 61/650,244, filed on May 22, 2012.

(51) Int. Cl.
*B29C 41/52*   (2006.01)
*B33Y 30/00*   (2015.01)
*B29C 64/135*  (2017.01)
*B33Y 50/02*   (2015.01)

(52) U.S. Cl.
CPC ............ *B29C 41/52* (2013.01); *B29C 64/135* (2017.08); *B33Y 30/00* (2014.12); *B33Y 50/02* (2014.12)

(58) Field of Classification Search
CPC .. B29C 41/52; B29C 67/0062; B29C 67/0066
See application file for complete search history.

(56) References Cited

U.S. PATENT DOCUMENTS 5,133,987 A  *  7/1992  Spence .................. B23K 26/04
                                                    118/620
5,209,878 A  *  5/1993  Smalley .............. B29C 67/0088
                                                    118/407

OTHER PUBLICATIONS

Adamson, A.W. et al. 1980. Transition region between an infinite plane meniscus and an adsorbed film. The Journal of Physical Chemistry, vol. 84, No. 20, pp. 2619-2623.

(Continued)

*Primary Examiner* — Robert J Grun
(74) *Attorney, Agent, or Firm* — McDermott Will & Emery LLP

(57) ABSTRACT

A system may produce a desired three dimensional object that includes a tank that holds a liquid that solidifies upon exposure to light; a controllable stage that controllably moves within the tank; a controllable light source that emits a light image in a controllable pattern; and a controller that controls the controllable stage and the controllable light source so as to cause at least three cascaded layers to be sequentially solidified in the liquid that collectively approximate at least a section of the desired three dimensional object and that collectively form at least one up-facing step at their outer edges; and, following the solidification of the at least three cascaded layers, cause a meniscus of the liquid to form and solidify in the at least one up-facing step. The controller may control the number and/or width of the sequentially solidified cascaded layers.

21 Claims, 21 Drawing Sheets

(56) References Cited

OTHER PUBLICATIONS

Diaz, M. E. et al. 2010. An analytical solution for a partially wetting puddle and the location of the static contact angle. Journal of colloid and interface science, vol. 348, No. 1, pp. 232-239.

Dynomotion. 2012. KMotion KFLOP. (Capture of http://dynomotion.com/KFLOP.html on Apr. 27, 2012, downloaded Dec. 6, 2013 from http://web.archive.org/web/20120427161320/http://dynomotion.com/KFLOP.html).

Dynomotion. 2012. KMotion SnapAmp 1000. (Capture of http://dynomotion.com/SnapAmp.html on Sep. 3, 2012, downloaded Dec. 6, 2013 from http://web.archive.org/web/201200903090252/http://dynomotion.com/SnapAmp.html).

EnvisionTec. 2008. Perfectory EnvisionTec SI500. Technical Data Sheet dated Feb. 2008. (Downloaded Dec. 6, 2013 from http://envisiontec.com/envisiontec/wp-content/uploads/2012/12/sl-500-polypropylene-material.pdf).

Hill, A.I. et al. 2011, On the shape of a hydrostatic meniscus attached to a corrugated plate or wavy cylinder, Journal of colloid and interface science, vol. 356, No. 2, pp. 763-774.

Jacobs, P.F. 1996. Stereolithography and Other RP&M Technologies, Society of Manufacturing Engineers, Dearborn, MI., Chapter 5—Advances in part accuracy, p. 167.

Jairazbhoy, V. 1996. Prediction of equilibrium shapes and pedestal heights of solder joints for leadless chip components. IEEE Transactions on Components, Packaging, and Manufacturing Technology: Part A, vol. 19, No. 2, pp. 224-233.

John, T. et al. 2006. Influence of surface tension on the conical meniscus of a magnetic fluid in the field of a current-carrying wire. Journal of Magnetism and Magnetic Materials, vol. 309, No. 1, pp. 31-35.

Math Works. 2011. MatLab: The Language of Technical Computing, Data Sheet, V. 9. (Link from May 2, 2012 Capture of http://www.mathworks.com/products/matlab/ with link to 2011 version of data sheet. Downloaded Dec. 6, 2013 from http://web.archive.org/web/20120502032350/http://www.mathworks.com/products/matlab/).

MathWorks. 2012. MatLab: The Language of Technical Computing. 2 pp. (Capture of http://www.mathworks.com/products/matlab/ on May 2, 2012, downloaded Dec. 6, 2013 from http://web.archive.org/web/20120502032350/http://www.mathworks.com/products/matlab/).

Micro-Vu. 2012. Micro-Vu Sol Measuring Machine Manual Vision Features. 2 pp. (Capture of http://www.microvu.com/sol.html on May 12, 2012, downloaded Dec. 6, 2013 from http://web.archive.org/web/20120512232038/http://www.microvu.com/sol.html).

Narahara, H. et al. 1995. Study on the improvement of surface roughness of complex model created by three dimensional photofabrication—proposal of lift up irradiation method. Journal of the Japan Society for Precision Engineering, vol. 61, No. 2, pp. 233-237. (English Abstract only).

Pan, Y. et al. 2012. Smooth Surface Fabrication in Mask Projection Based Stereolithography. Journal of Manufacturing Processes, vol. 14, pp. 460-470.

Rooks, S. et al. 1991. Evaluation of two-dimensional and three-dimensional axisymmetric fluid interface shapes with boundary conditions. Langmuir, vol. 7, No. 12, pp. 3222-3228.

Sager, B. et al. 2008. Use of parameter estimate for stereolithography surface finish improvement. Rapid Prototyping Journal, vol. 14, No. 4, pp. 213-220.

Velmex, Inc. 2012. Examples of Motorized Linear Stages & Rotary Indexing Tables. 20 pp. (Capture of http://www.velmex.com/motor_examples.html on May 28, 2012, downloaded Dec. 6, 2013 from http://web.archive.org/web/20120528214515/http://velmex.com/motor_examples.html.).

Wayner, P. 1980. Interfacial profile in the contact line region of a finite contact angle system. Journal of Colloid and Interface Science, vol. 77, No. 2, pp. 495-500.

White, L.R. 1977. On deviations from Young's equation. Journal of Chemical Society, Faraday Transactions, vol. 73, No. 1, pp. 390-398.

Williams, R.E. et al. 1998. Abrasive flow finishing of stereolithography prototypes. Rapid Prototyping Journal, vol. 4, No. 2, pp. 56-67.

* cited by examiner

```
Input: Set of sampling points of the geometry profile and
Meniscus profile (x, f, df/x); (x, F, dF/x); The goal preferences
weights V1, V2; layer thickness h; Meniscus height hc;

Solution={};
Unvisited={all f in the geometry profile};
Ksets={-0.5 -0.3 -0.1 0  0.1  0.2 0.3 0.4 0.5 0.6 0.7 0.8 0.9 1}
KErrors={};
f0 =hc;

While (Unvisited is not empty)
   if (f0 is in Solution)
      f0=f0+hc;
   endif
   Kerrors={};
   //feasibility check
   for each k in Ksets
      compute the approximation error and continuous error;
      if(both approximation error and continuous error are within
           acceptable ranges)
         weighted_error = V1 x appro_error+ V2 x conti_error;
         push (k, weighted_error) back to Kerrors ();
      endif
   endfor
   if (Kerrors is not empty)
      select k with smallest weighted_error;
      push (k, f0) into Solution
      delete all points that fx<=f0 in unvisited set.
   else
      f0=f0-h;
   end
return failed or Solution ((k0, f0) (k1,f1) (k2,f2),... ... )
```

FIG. 14

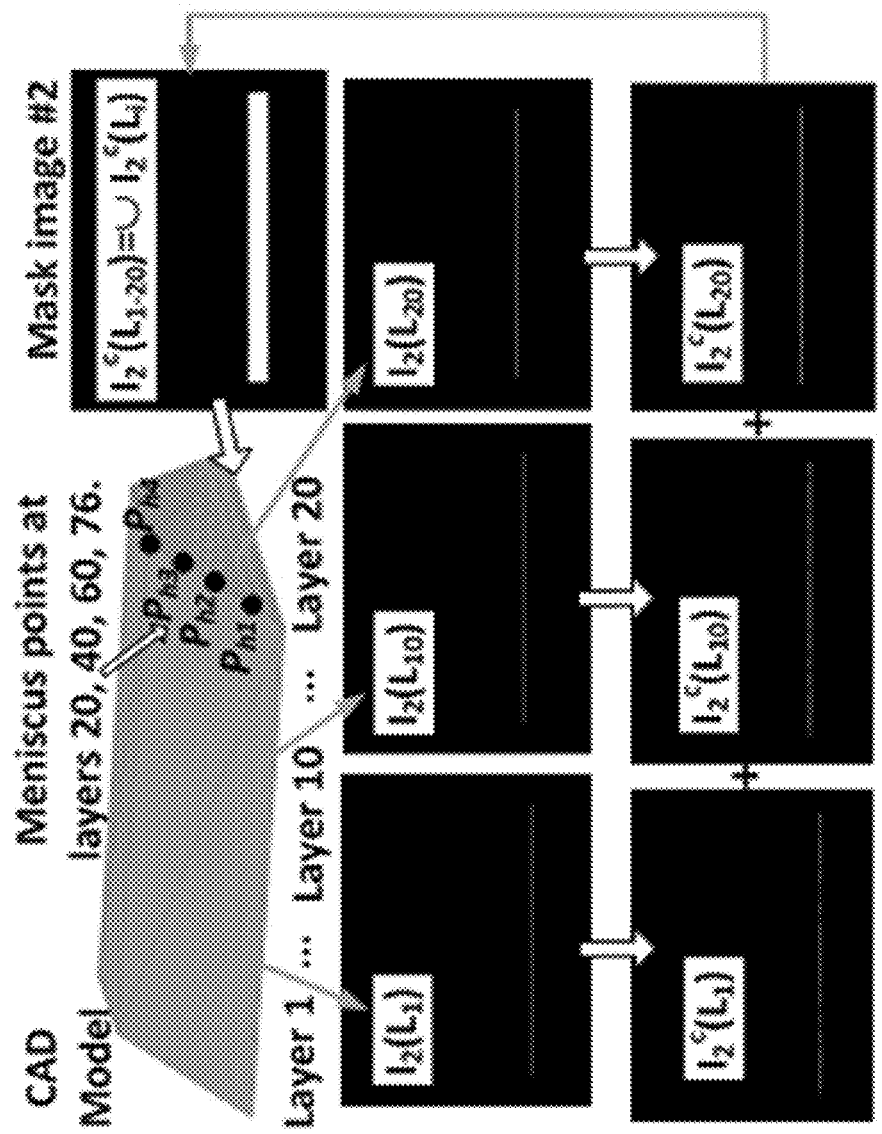

PROCESS PLANNING OF MENISCUS SHAPES FOR FABRICATING SMOOTH SURFACES IN MASK IMAGE PROJECTION BASED ADDITIVE MANUFACTURING

CROSS-REFERENCE TO RELATED APPLICATION

This application is based upon and claims priority to U.S. provisional patent application 61/650,244, entitled "DIGITAL MASK IMAGE PROJECTION BASED ADDITIVE MANUFACTURING WITH SMOOTH SURFACES," filed May 22, 2012. The entire content of this application is incorporated herein by reference.

BACKGROUND

Technical Field

This disclosure relates to image, projection-based, additive manufacturing.

Description of Related Art

The surface finish of three dimensional objects made by image, projection-based additive manufacturing (AM) may be critical, such as for applications in optics, micro-fluid flow, and mechanical assembly, in which optical lenses, fluidic channels, and/or rotating components may all need to be smooth. However, there may be a stair-stepping effect in layer-based additive manufacturing processes in which a three-dimensional model is approximated by a set of two-dimensional layers. This may cause the fabricated surface to have a poor surface finish, especially when close to the horizontal plane.

FIG. 1 illustrates a layer-based additive manufacturing process and related stair-stepping effect. As shown in FIG. 1, a given three-dimensional (3D) model may first be sliced into a set of two-dimensional (2D) layers. By stacking these 2D layers together, a physical part can be fabricated in an AM process to approximate the original computer-aided design (CAD) model.

Due to the use of 2D layers, the fabricated part surfaces, especially ones whose normals are close to the building direction (Z axis), may have large approximation errors. Such poor surface quality may limit the use of AM in applications that require smooth surfaces, such as the fabrication of optical lenses, 3D micro-channels in microfluidic systems, and various assembly features in mechanism designs.

The approximation error may depend on the layer thickness used in the slicing of a 3D model. One approach for addressing the stair-stepping effect in AM may be to reduce the layer thickness. For example, the layer thickness typically used in a Stereolithography Apparatus (SLA) system may be 0.1 mm, while the layer thickness used in a recently developed inkjet-based systems (e.g. ones from Objet Geometries Ltd) can be as small as 0.012 mm.

While thinner layers may result in less stair-stepping problems, the use of such ultra-thin layer thickness may also significantly slow down the building process. In addition to a great sacrifice in building speed, it may be challenging for some AM processes to significantly reduce their layer thicknesses. For example, in the SLA process, the spreading of liquid resin into uniform ultra-thin layers can be difficult due to liquid viscosity.

SUMMARY

A system may produce a desired three dimensional object. The system may include a tank that holds a liquid that solidifies upon exposure to light. A controllable stage may controllably moves within the tank. A controllable light source may emits a light image in a controllable pattern. A controller may controls the controllable stage and the controllable light source so as to cause at least three cascaded layers to be sequentially solidified in the liquid that collectively approximate at least a section of the desired three dimensional object and that collectively form at least one up-facing step at their outer edges. Following the solidification of the at least three cascaded layers, the controller may cause a meniscus of the liquid to form and then solidify in the at least one up-facing step.

The controller may control the number of sequentially solidified cascaded layers in which the meniscus is formed to cause the outer surface that remains after solidification of the meniscus to substantially conform to the section of the outer surface of the desired three dimensional object.

The controller may control the width of each of the sequentially solidified cascaded layers in which the meniscus is formed to cause the outer surface that remains after solidification of the meniscus to substantially conform to the section of the outer surface of the desired three dimensional object.

The controller may control the number and width of the sequentially solidified cascaded layers using a greedy algorithm.

The controller may control the number and the width of the sequentially solidified cascaded layers using an algorithm derived from one or more simulations of this process.

The controller may include a calibration subsystem that allows a user to calibrate a relationship between desired locations of light above a surface of the liquid from the light source with a command signal to the light source that is needed to effectuate illumination at each desired location.

The controller may include information indicative of the shape of the meniscus, including the shape for each of multiple types of liquid.

The controller may cause multiple, cascaded layers of meniscus to sequentially form and solidify in the at least one up-facing step.

A non-transitory, tangible, computer-readable storage media may contain a program of instructions that cause a controller running the program of instructions to provide any combination of the control functions discussed herein.

The viscosity of the liquid may be adjusted to cause the meniscus to have a desired shape.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 10A illustrates different widths and heights of vertical planes, and FIG. 10B illustrates combinations of these examples.

FIG. 14 illustrates an example of a Greedy algorithm searching for optimal meniscus parameter settings.

FIGS. 16A-16D illustrates an example of meniscus image planning. FIG. 16A illustrates an input CAD model with related meniscus points. FIG. 16B illustrates meniscus image planning the mask image$_2$ of three sampling layers for curing formed meniscuses in related layers. FIG. 16C illustrates meniscus image planning the mask images of the sampling layers after considering the distortion associated with different Z heights after raising up. FIG. 16D illustrates meniscus image planning the projected mask image$_2$ for curing the meniscuses formed in the first 20 layers.

FIG. 17A illustrates hardware. FIG. 17B illustrates software setups.

FIG. 18A illustrates a CAD model and built part. FIG. 18B illustrates surface measurement results. FIG. 18C illustrates microscopic images of the built surfaces.

FIG. 19A illustrates a CAD model and built part. FIG. 19B illustrates surface measurement results. FIG. 19C illustrates microscopic images of the built surfaces.

FIG. 20A illustrates a CAD model and built part. FIG. 20B illustrates surface measurement results. FIG. 20C illustrates microscopic images of the built surfaces.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
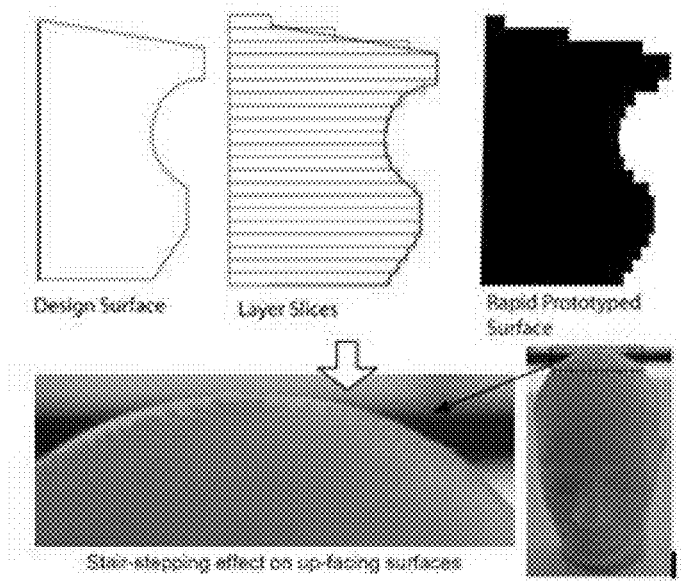
FIG. 1 illustrates an example of a layer-based additive manufacturing process and a related stair-stepping effect.
Figure 2:
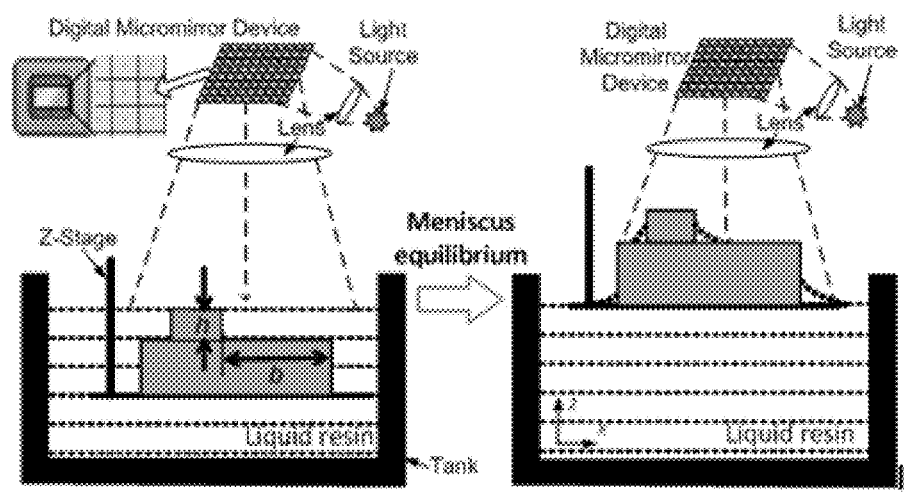
FIG. 2 illustrates an example of a meniscus equilibrium approach for improving surface finish of mask image projection based sterolithography (MIP-SL).

FIG. 2 illustrates an example of a meniscus equilibrium approach for improving surface finish in mask image projection based sterolithography (MIP-SL).

An additive manufacturing (AM) process may use mask-image-projection-based stereolithography (MIP-SL) [Zhou, C., Chen, Y., Waltz, R. A., 2009, "*Optimized mask image projection for solid freeform fabrication*", ASME Journal of Manufacturing Science and Engineering, Vol. 131, No. 6, pp. 061004-1-12]. The MIP-SL process may be similar to the Stereolithography Apparatus (SLA) process. However, instead of using a laser as in SLA, a Digital Micromirror Device (DMD) may be used in the MIP-SL process (refer to FIG. 2A).

As a microelectromechanical system (MEMS) device, a DMD may enable one to simultaneously control ~1 million small mirrors to turn on or off each pixel at over 5 KHz. Consequently, mask images can be dynamically defined and projected on a surface area under the control of a controller. By replacing a laser with a DMD, the MIP-SL process may be much faster than the SLA process. A different form of light source may be used instead.

All surfaces in a 3D model may be classified based on the Z axis and its surface normal N into: (1) vertical surfaces (N·Z=0), (2) down-facing surfaces (N·Z<0), and (3) up-facing surfaces (N·Z>0). There may be no need to specially consider the vertical surfaces since they may not contribute to the stair-stepping effect. Approaches such as controlled curing depth, Limaye, A. S., and Rosen, D. W., 2007, "*Process planning method for mask projection micro-stereolithography*", Rapid Prototyping Journal, Vol. 13, Iss: 2, pp. 76-84; Sager, B., and Rosen, D. W., 2008, "*Use of parameter estimate for stereolithography surface finish improvement*", Rapid Prototyping Journal, Vol. 14, No. 4, pp. 213-220, have been developed for the fabrication of smooth down-facing surfaces. However, there may have been no good approach for the fabrication of smooth up-facing surfaces, since the cured portions related to such surfaces are under liquid resin during the building process.

The liquid meniscus related to different process parameters that can be controlled in the MIP-SL process has been studied. Based on findings, a meniscus equilibrium method was developed for the fabrication of smooth up-facing surfaces (refer to FIG. 2). The approach may closely match fluid interfaces at the corners of intersecting planes to related curved surfaces in the input geometry. Hence, a liquid meniscus may be formed at the corners when the cured layers emerge from the liquid. The shape of the meniscus may depend on the contact of horizontal and vertical surfaces, and can be modeled by considering the effects of capillarity, suction by gravity, multilayer adsorption, and boundary conditions (Elena, D. M., Fuentes, J., Cerro, R. L., and Savage, M. D., 2010, "*An analytical solution for a partially wetting puddle and the location of the static contact angle*", Journal of colloid and interface science, Vol.

348, no. 1, pp. 232-239; Neumann, A. W., Benhabib, B., Szekely, J., Racz, L. M., and Rooks, S., 1991, "*Evaluation of two-dimensional and three-dimensional axisymmetric fluid interface shapes with boundary conditions*", Langmuir, vol. 7, no. 12, pp. 3222-3228).

Accordingly, a process optimization problem can be formulated in order to match the meniscus to a given curved surfaces. The presented method may have a better shape controllability over approaches of dipping and flush-curing the build parts or post-processing, such as abrasive flow machining (Williams, R. E., and Melton, V. L., 1998, "*Abrasive flow finishing of stereolithography prototypes*", Rapid Prototyping Journal, Vol. 4, Iss: 2, pp. 56-67).

Compared to the use of ultra-thin layers that may significantly elongate building time, the techniques described herein may enable a much larger layer thickness to be used, while achieving better surface finish requirements. Hence, significantly reduced building time may result in the MIP-AM process.

Meniscus Modeling in the MIPSL Process

The formation of an interfacial profile of the equilibrium meniscus that is attached to intersecting surfaces is now discussed. Such understanding and related mathematical models provide a basis for process planning and smoothness control in building the up-facing surfaces.

Figure 3A:
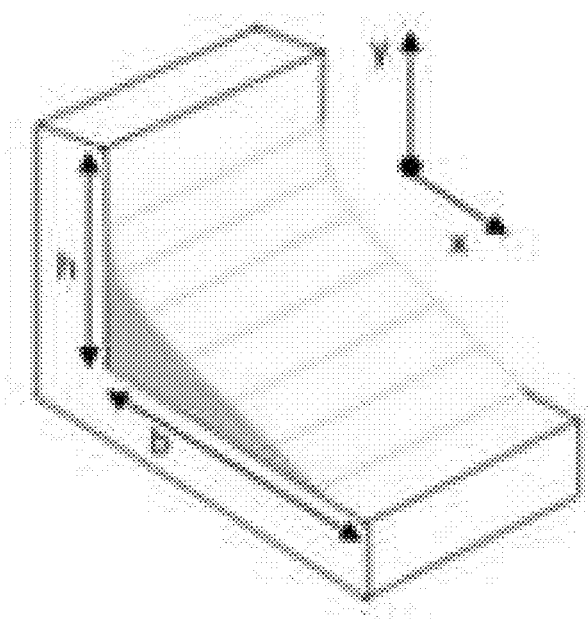
FIG. 3A illustrates an example of meniscus wetting intersecting plane surfaces.
Figure 3B:
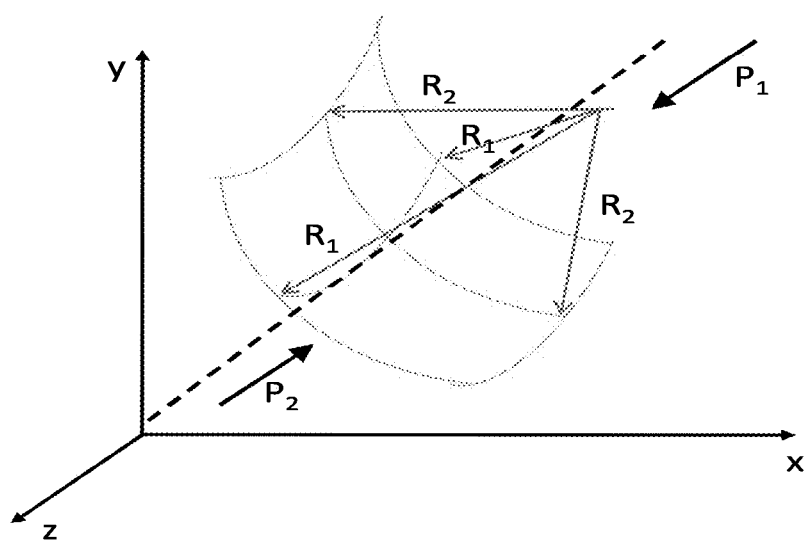
FIG. 3B illustrates an example of a fluid interface profile.

FIGS. 3A and 3B illustrate an example of meniscus wetting to intersecting plane surfaces and a fluid interface profile. As shown in FIG. 3A, given a pair of walls, the length of the horizontal plane may be b, and the height of the vertical plane may be h. More than two layers may be used to make the vertical plane h. With a finite horizontal plane, the maximum range of the fluid that can rise up on an infinite vertical plane $y(x=0, x_{length}=b)$ is $h_c$. Similarly, with a finite vertical plane, the maximum range of the fluid that can extend along an infinite horizontal plane $x(y=0, y_{length}=h)$ may be $b_0$.

Research on determining equilibrium shapes of fluid interfaces has been performed (Wayner, P., 1980, "*Interfacial profile in the contact line region of a finite contact angle system*", Journal of Colloid and Interface Science, vol. 77, no. 2, pp. 495-500; Jairazbhoy, V., 1996, "*Prediction of equilibrium shapes and pedestal heights of solder joints for leadless chip components*", IEEE Transactions on Components, Packaging, and Manufacturing Technology: Part A, vol. 19, no. 2, pp. 224-233; Hill, A. I., and Pozrikidis, C., 2011, "*On the shape of a hydrostatic meniscus attached to a corrugated plate or wavy cylinder*", Journal of colloid and interface science, vol. 356, no. 2, pp. 763-774; Rannacher, D., John, T., and Engel, A., 2006, "*Influence of surface tension on the conical meniscus of a magnetic fluid in the field of a current-carrying wire*", Journal of Magnetism and Magnetic Materials, vol. 309, no. 1, pp. 31-35; Adamson, A. W., and Zebib, A., 1980, "*Transition region between an infinite plane meniscus and an adsorbed film*", The Journal of Physical Chemistry, vol. 84, no. 20, pp. 2619-2623).

The Young-Laplace (YL) equation may be the most widely accepted physical analysis of equilibrium meniscus shape. In the analysis, two types of forces, surface tension and pressure, may be taken into account. The surface tension may be defined with respect to a specific photopolymer resin. It is a thermodynamic quantity measuring the energy required to expand the area of the gas-liquid interface. As shown in FIG. 3B, the YL equation may relate the pressure difference ΔP across a fluid interface within a gravitational field to the curvature of the interface and the interfacial tension by:

$$\Delta P = P_1 - P_2 = -\rho g y = \gamma_{12} \times \left(\frac{1}{R_1} + \frac{1}{R_2}\right) \quad (1)$$

where $P_1$ and $P_2$ are the pressures on either side of the interface between resin and air, g is gravity acceleration, y is the height of the meniscus above the horizontal plane surface, $\gamma_{12}$ is the interfacial tension, and $R_1$ and $R_2$ are the radii of curvature of the fluid interface. If $R_1$ can be considered infinite, the problem may be simplified to a 2D case. Thus the following Eq. (2) can be derived from Eq. (1):

$$\rho g y - \gamma_{12} \times \frac{\ddot{y}}{(1+\dot{y}^2)^{2/3}} = 0; \quad \dot{y} = \frac{dy}{dx}; \quad \ddot{y} = \frac{d\dot{y}}{dx} \quad (2)$$

The interfacial tension γ may have a relation with the capillary height $h_c$ and the contact angle θ as shown in Eq. (3).

$$h_c^2 = 2\frac{\gamma}{\rho g}(1 - \sin\theta); \quad (3)$$

So Eq. (4) can be developed according to Eq. (2) and (3).

$$\rho g y - \frac{1}{2}h_c^2 \times \frac{\rho g \ddot{y}}{(1-\sin\theta)(1+\dot{y}^2)^{2/3}} = 0 \quad (4)$$

Process Parameter Calibration

The contact angle θ in Eq. (4) may be the angle at which the liquid resin interface meets the solidified resin surface. Specific to the given liquid and solid system, the contact angle may be determined by the interactions between the liquid resin, solidified resin and air interfaces. Researchers reported that θ is observed to be independent of volume and gravity and depends only on surface tension (White, L. R., 1977, "*On deviations from Young's equation*", Journal of Chemical Society, Faraday Transactions, Vol. 73, no. 1, pp. 390-398; Zisman, W. A., 1964, "*Relation of the equilibrium contact angle to liquid and solid constitution*", In: R. F. Gould, Editors, Advances in Chemistry Series 43, American Chemical Society, Washington, D.C., pp. 1-55). The capillary height $h_c$ may be the maximum height that the fluid can reach on an infinite vertical wall. $h_c$ may be a characteristic length for the fluid subject to gravity and surface tension.

Both parameters (θ and $h_c$) can be experimentally measured. Based on different b and h values, a set of experiments has been designed. The MIP-SL process was used in building the test parts with intersecting horizontal and vertical surfaces. After the horizontal and vertical surfaces have been built, the part is first merged inside liquid resin; it is then lifted slowly up by the stage until the horizontal plane is totally outside the liquid resin. A liquid meniscus in contact with the intersecting surfaces will be formed on the part surfaces. After a long waiting time, the liquid volume may reach equilibrium over the horizontal wettable surface area. A mask image may then be projected on the meniscus area to cure the liquid resin by a light source. The process may be repeated to add multiple layers of meniscus, when helpful to better approximating the surface shape of a desired three dimensional object.

The shape of the formed meniscus can thus be captured in the built part. A set of parts with different sized horizontal and vertical planes has been built.

Figure 4:
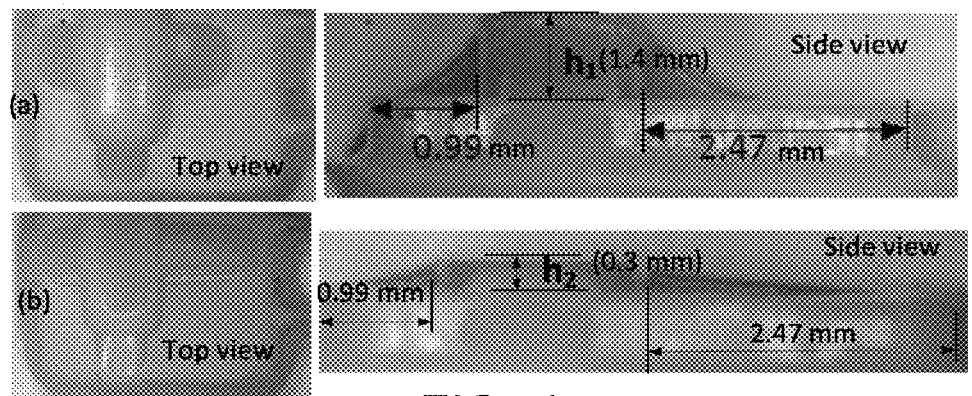
FIGS. 4A and 4B illustrate an example of two built parts with different b and h values that may be used for measuring surface tension parameters.

FIGS. 4A and 4B illustrate an example of two built parts with different b and h values that may be used for measuring surface tension parameters. Based on the experiments, the contact angle θ and the capillary height $h_c$ can be measured. For the liquid resin used in experiments (Perfactory SI500 from EnvisionTEC, Ferndale, Mich.), it is estimated that θ=25°, and $h_c$=1.40 mm.

Meniscus Shape Analysis and Simulation

In the MIP-SL process, h denotes the height of the vertical plane, b denotes the length of the horizontal plane, and $h_c$ and $b_0$ denote the maximum values that the liquid can reach on the vertical and horizontal planes, respectively. The formed meniscus shapes for different b and h values can thus be analyzed based on the following four scenarios:

Case 1: $h > h_c; b > b_0$;
Case 2: $h < h_c; b > b_0$;
Case 3: $h > h_c; b < b_0$; and
Case 4: $h < h_c; b < b_0$.

For each scenario, different boundary conditions can be derived. Hence, the formed meniscus shapes may be different, and are now discussed.

Case 1: Both h and b can be considered infinite.
The related boundary conditions may be:

$$\dot{y}(x=0) = -c \tan \theta = -c \tan 25° = -2.14129; x(0) = b = \infty \quad (5)$$

Using the governing Eq. (4) and boundary conditions Eq. (5), the height that the fluid can reach on the vertical wall is calculated to be 1.398372 mm, which agrees well with the experiment result of 1.40 mm.

Figure 5:
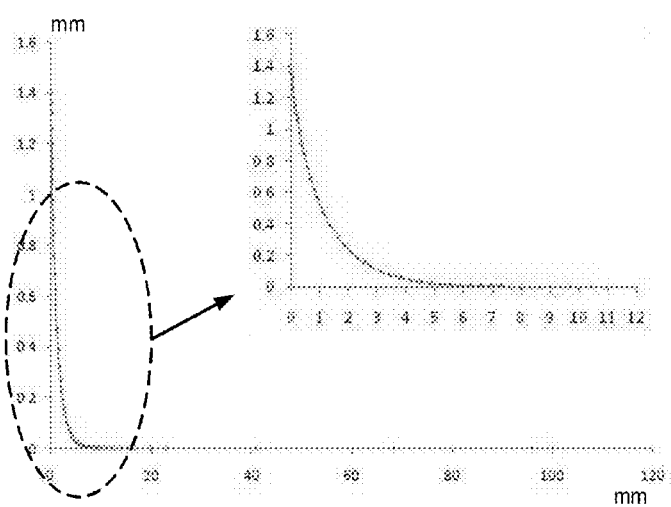
FIG. 5 illustrates an example of plotting results of a meniscus profile.

FIG. 5 illustrates an example of plotting results of a meniscus profile of case 1. Matlab (MathWorks, Natick, Mass.) was used to solve this problem and plotted the result as shown in FIG. 5.

Case 2: h is smaller than $h_c(x=\infty)$, and b can be considered infinite.

Hence the curvature of the meniscus is decided by h. The boundary conditions may be as follows.

$$\dot{y}(x=0) = -c \tan \theta = -c \tan 25° = -2.14129; y(0) = h;$$
$$\dot{y}(y=0) = -c \tan \theta \le -c \tan 65° = -0.466038; \quad (6)$$

In this case, the length of the fluid extended on the horizontal plane $b_0$ may be dependent on the value of h, namely, $b_0 = f(h)$. The meniscus shapes with different h values were estimated by solving the governing Eq. (4) and the boundary conditions described in Eq. (6) using Matlab.

Figure 6A:
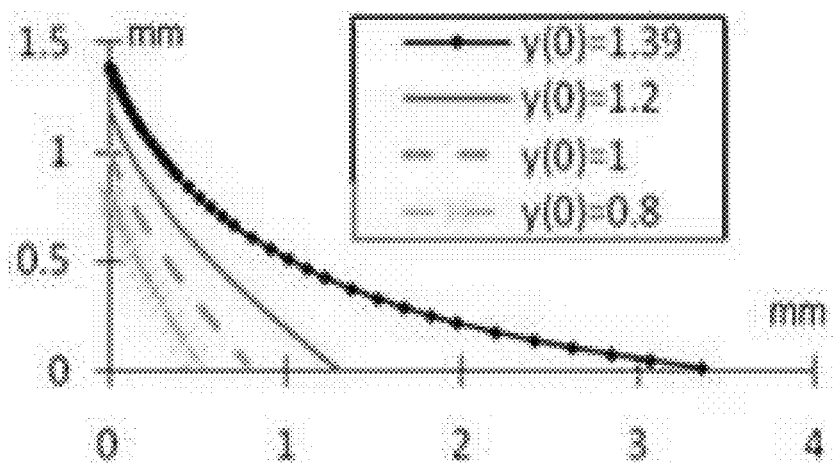
FIGS. 6A and 6B illustrate another example of plotting results of a meniscus profile.
Figure 6B:
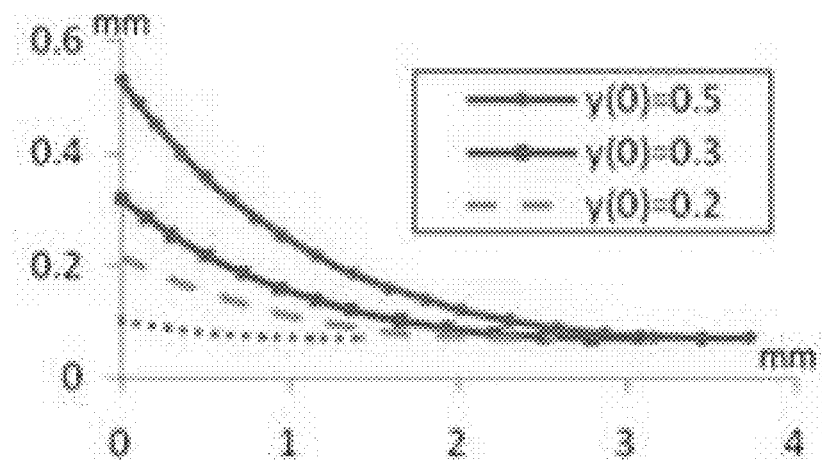

FIGS. 6A and 6B illustrate an example of plotting results of a meniscus profile of case 2. The plotting results of different h values are shown in FIG. 6.

Case 3: h is bigger than $h_c(x=\infty)$ and b is smaller than $b_0$.

Figure 7:
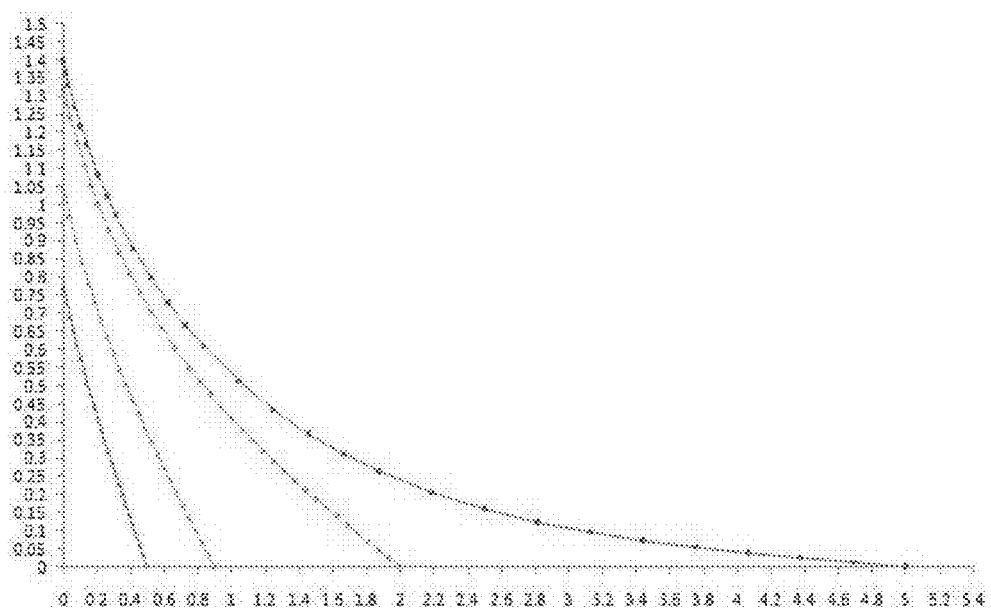
FIG. 7 illustrates another example of plotting results of a meniscus profile.

FIG. 7 illustrates an example of plotting results of a meniscus profile of case 3.

Thus, the curvature of the meniscus may be decided by b.
The boundary conditions may be as follows.

$$\dot{y}(x=0) = -c \tan \theta = -c \tan 25° = -2.14129;$$

$$\dot{y}(y=0) = -c \tan \theta \le -c \tan 65° = -0.466038;$$

$$y(b) = 0 \quad (7)$$

Based on the governing Eq. (4) and the boundary condition Eq. (7), the meniscus shapes can be computed in Matlab. FIG. 7 shows the plotting results for different b values.

Case 4: h is smaller than $h_c(x=\infty)$, and the length of the horizontal plane b is smaller than $b_0$.

Hence, the curvature of the meniscus may be decided by both b and h. The problem may follow the boundary conditions:

$$y(0) = h, y(b) = 0 \quad (8)$$

The meniscus shape can be calculated for different b and h values.

Figure 8A:
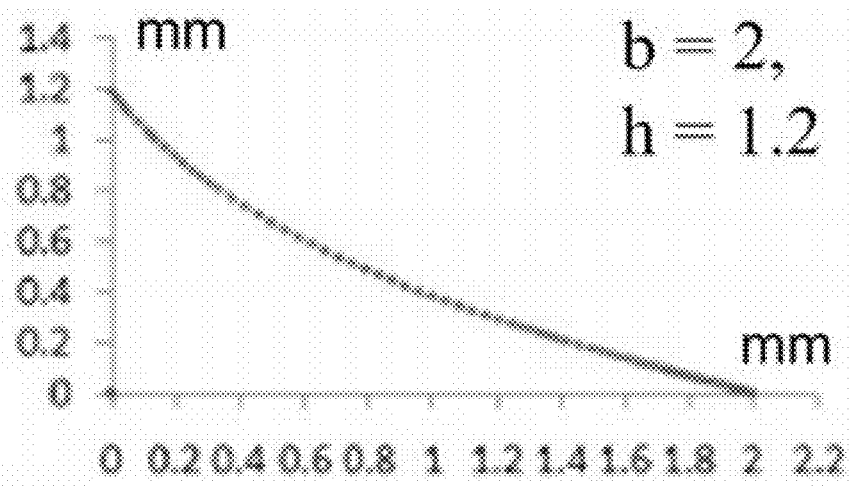
FIGS. 8A-8C illustrate other examples of plotting results of a meniscus profile.
Figure 8B:
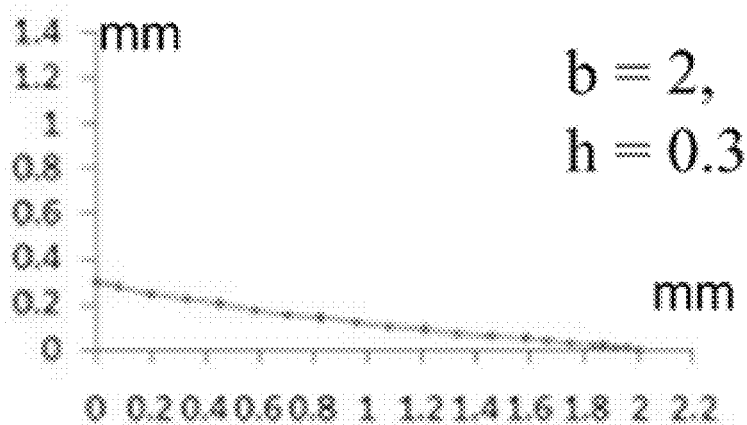
Figure 8C:
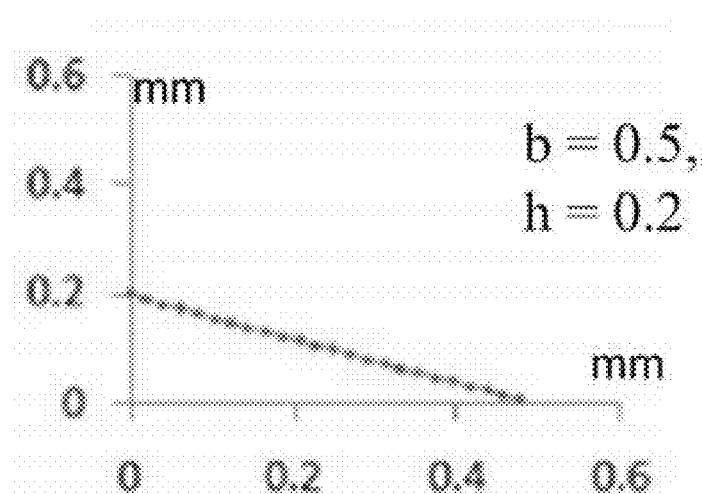

FIGS. 8A-8C illustrate an example of plotting results of a meniscus profile of case 4. Three examples using Matlab to solve the mathematic model and the related boundary conditions for different b and h values are shown in FIG. 8.

Process Planning for Building Smooth Up-Facing Surfaces

Figure 9A:
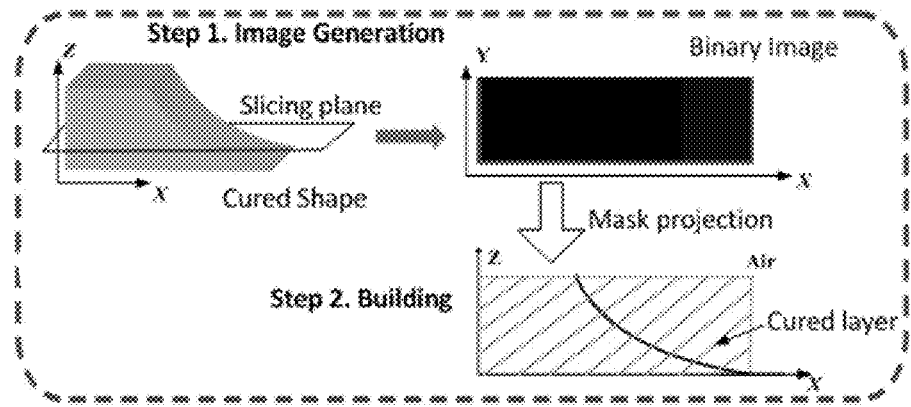
FIGS. 9A and 9B illustrate a comparison between an example of a traditional additive manufacturing method (FIG. 9A) and a meniscus equilibrium method (FIG. 9B).
Figure 9B:
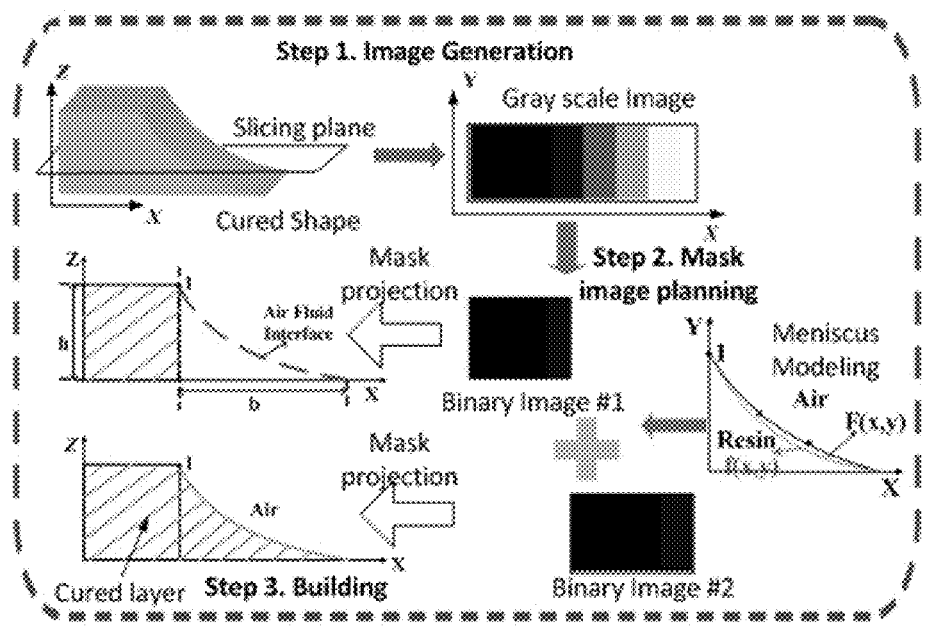

FIGS. 9A and 9B illustrate a comparison between an example of a traditional method (FIG. 9A) and a meniscus equilibrium method (FIG. 9B).

Suppose an input 3D CAD model with curved up-facing surfaces is given as shown in FIG. 9A. The traditional additive manufacturing method slices the model into multiple 2D layers based on a given layer thickness. One mask image will be generated for each layer in the MIP-SL process to cure the related 2D shape. Consequently, the built part may have stair-stepping defects.

In comparison, FIG. 9B illustrates steps of the meniscus equilibrium method for achieving smooth up-facing surfaces. For a specific layer i, c(x, y) is computed which represents the ratio of the Z-height at the location (x, y) to the layer thickness $L_T$. Similar to Zhou, C., and Chen, Y., 2009, "*Three-dimensional digital halftoning for layered manufacturing based on droplets*", Transactions of the North American Manufacturing Research Institution of SME, Vol. 37, pp. 175-182), a sliced image with gray scale values can be generated for each layer. Accordingly, the thickness at pixel (x, y) may be c(x, y)×$L_T$. Hence, instead of a binary layer image, the sliced image has pixels with ratios c(x, y). Note c(x, y) is continuous and c(x, y)∈[0, 1].

Suppose the original gray scale image can be split into two mask images, image #1 and #2. As shown in FIG. 9B, the mask $image_1$ can cure a portion of layer i that will be used in forming meniscus; the mask $image_2$ can be used in curing the formed meniscus based on $image_1$. Note that it may not be necessary to use the meniscus equilibrium approach in building each layer. That is, depending on the given geometry, meniscuses can be formed by $image_2$ after multiple layers of $image_1$ have been built, such as after three or more layers have been build. This is different from the approach presented in Narahara, H. and Saito, K., 1995, "*Study on the improvement of surface roughness of complex model created by three dimensional photo fabrication—proposal of lift up irradiation method*", Journal of the Japan Society for Precision Engineering, Vol. 61, No. 2, pp. 233-7; Jacobs, P. F., 1996, "*Stereolithography and Other RP&M Technologies*", Society of Manufacturing Engineers, Dearborn, Mich., 16, for the SLA process, in which the formed meniscuses are cured in each layer. In addition to slow building speed, such an approach was found to only work for up-facing surfaces that are 40° or less from the horizontal. Such a limitation can be explained by the presented meniscus shape modeling.

Figure 10A:
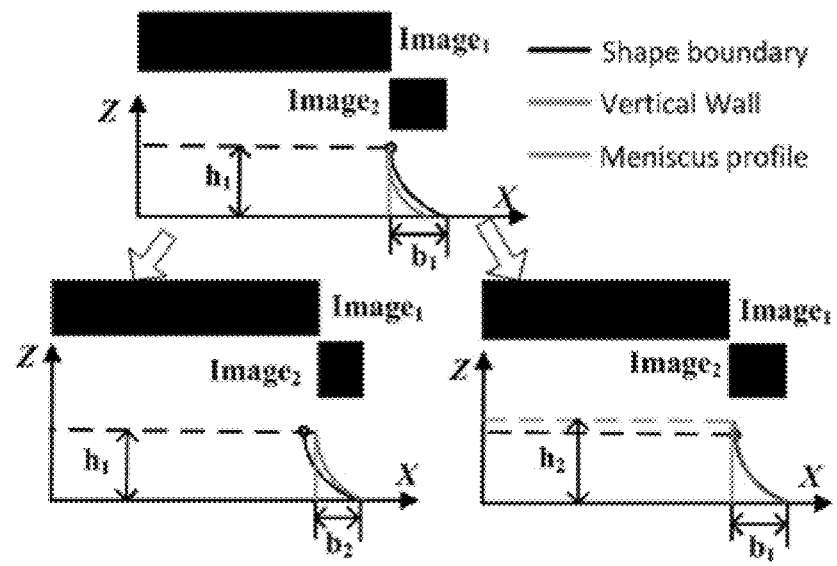
FIGS. 10A and 10B illustrate an example of a process planning problem for the meniscus equilibrium method.
Figure 10B:
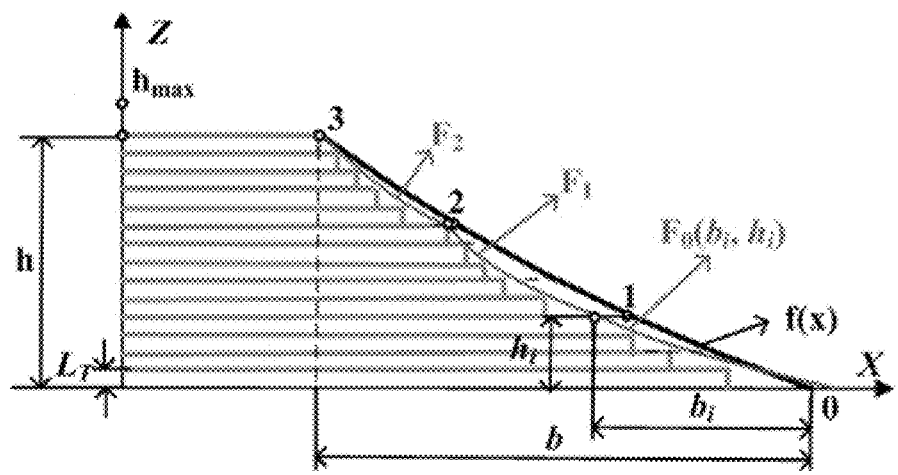

FIGS. 10A and 10B illustrate an example of a process planning problem for the meniscus equilibrium method. FIG. 10A illustrates different widths and heights of vertical planes, and FIG. 10B illustrates a combination of these variations.

As discussed in the meniscus mathematical model, two important parameters in determining the shape of the meniscus profile may be h and b. Thus, the planning of image₁ and image₂ can change the setting of h and b, which leads to different approximation errors between the meniscus profiles and the desired shapes. An illustration example is shown in FIG. 10A. For the given shape boundary defined by black lines, two different sets of mask images (image₁ and image₂) can be used, which define two vertical walls as shown in brown lines. Accordingly, the formed meniscuses may have different profiles due to different b or h values as shown in FIG. 10A.

In order to generate a MIP-SL process plan that can ensure the meniscus shapes match given curved geometry, the process planning for the up-facing surfaces can be mathematically defined. Both shape and curvature approximation errors may be considered. The shape approximation errors $\epsilon_a$ can be computed by comparing the difference between the desired geometry profile f(x) and the meniscus profile F(x). The curvature approximation error $\epsilon_c$ can be computed by comparing the first derivative values of f(x) and F(x). Typically, the profile is continuous within each meniscus while discontinuity may exist among neighboring meniscuses. Hence, the goal in the process planning may be to prepare a set of mask images such that the approximation errors can be minimized. Accordingly, the related problem can be formulated as follows:

Input: A curve surface f(x, h), a layer thickness, and goal preferences as weights $W_1$ and $W_2$.

Find: A set of $b_i$ and $h_i$

Satisfy: $F_i(x)=F(b_i,h_i)$ $\epsilon_{a\_i} = \int_{x_i}^{x_{i+1}} |f(x)-F_i(x)|dx = \Sigma_{k=0}^n \nabla d_i(x_k);$ $\epsilon_{c\_i} = |\dot{F}_{i+1}(x) - \dot{F}_i(x)|;$ $b=\Sigma b_i; h=\Sigma h_i.$ Minimize: $W_1 \cdot Max(\epsilon_{a\_i}) + W_2 \cdot Max(\epsilon_{c\_i})$, or $$W_1 \cdot \Sigma \epsilon_{a\_i} + W_2 \cdot \Sigma \epsilon_{c\_i}. \quad (9)$$

As shown in FIG. 10B, suppose a boundary curve y=f(x) ($y \in (0,h), x \in (x_1, x_2)$) is given. The input curve can be divided into several pieces such that h in the process planning is smaller than the maximum vertical height $h_c$ as discussed in the meniscus model (Case 1). Suppose $L_T$ is the layer thickness and a sampling distance e is used in computing the errors of the meniscus profile. An algorithm based on the greedy heuristic can be developed as follows: The meniscus shape in the area of y∈(0,h) is first estimated and compared with the input geometry, with various $b_i$ value settings. If the errors are within the acceptable ranges, $P_h$ (i.e. point 3) can be selected as the meniscus point and the $b_i$ value was chosen to give the smallest weighted errors; otherwise, the meniscus shapes in the area of y∈(0,h−i×$L_T$), i=1, 2, . . . are estimated until a meniscus point $P_{h0}$ is found that satisfies the given approximation error ranges (e.g. point 1). The remaining curve can then be processed in a similar way to identify all the meniscus points $P_{hi}$ (e.g. points 1, 2, 3). Based on the identified meniscus points, a set of projection images (image₁ and image₂) can then be computed for the building process. Accordingly, image₁ can be used in solidifying resin in each layer. When the current layer number comes to $h_i$ related to the meniscus point $P_{hi}$, the fabricated model be raised up from the liquid resin by the stage; after certain waiting time, related mask image₂ may then be projected on the portion of the part surface to cure the formed meniscus shapes in such areas.

To assist the mask image planning, a coefficient k may be used instead of the parameter $b_i$ in the problem solving. It may be defined as:

$k=b_k/b_t$ where $b_t$ is the width difference of the top layer and the bottom layer in the meniscus area.

Figure 11:
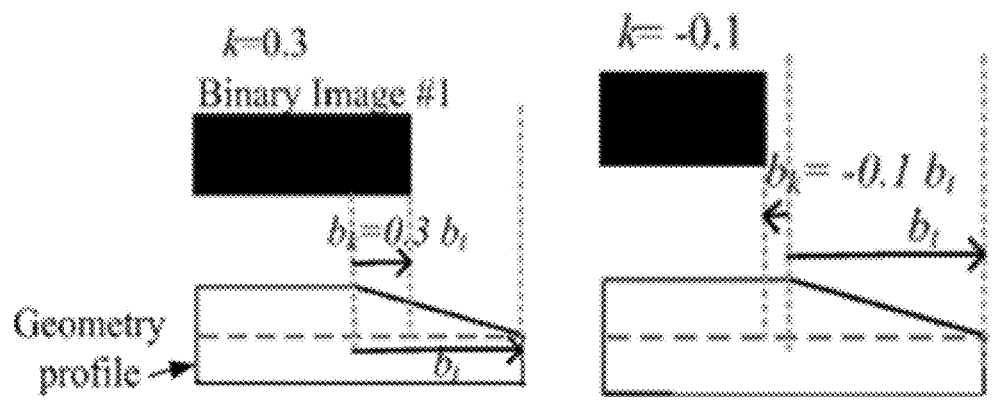
FIG. 11 illustrates an example of a k calculation.

FIG. 11 illustrates an example of a k calculation. To simplify the model, k may be set to be consistent within the same meniscus period, that is, between each meniscus projection, all the binary image #1 is designed based on the same k value.

Figure 12:
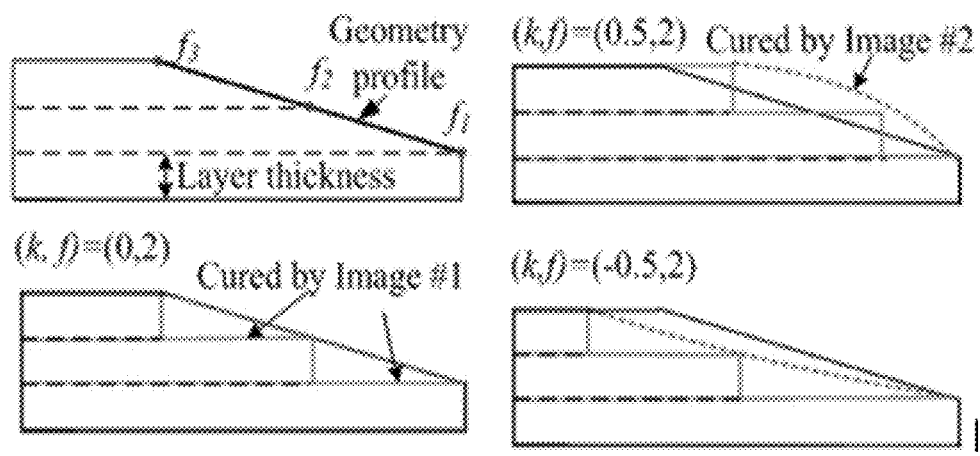
FIG. 12 illustrates an example of curing shape with different (k,f) settings.

FIG. 12 illustrates an example of curing shape with different (k,f) settings. The geometry profile was sampled to a set of points with a sampling distance h which is the layer thickness, like f1, f2, f3 in FIG. 12. As shown in FIG. 12, different settings of (k,f) may cause different built shape, thus leading to different approximation errors and continuous errors. The CAD model shown in FIG. 19A was analyzed as an example. The curing result was simulated with different settings k=−0.1, 0, 0.1, 0.2, 0.3, 0.4, 0.5, 0.6 and h=2, 4, 6. Then, the corresponding errors were calculated by comparing with the geometry profile. The result is shown in FIG. 12. Take (0.2, 6) as an example. It means the image #1 was designed based on k=−0.1 to cure every layer, and the image #2 was exposed every 6 layers to cure the meniscus area.

Figure 13:
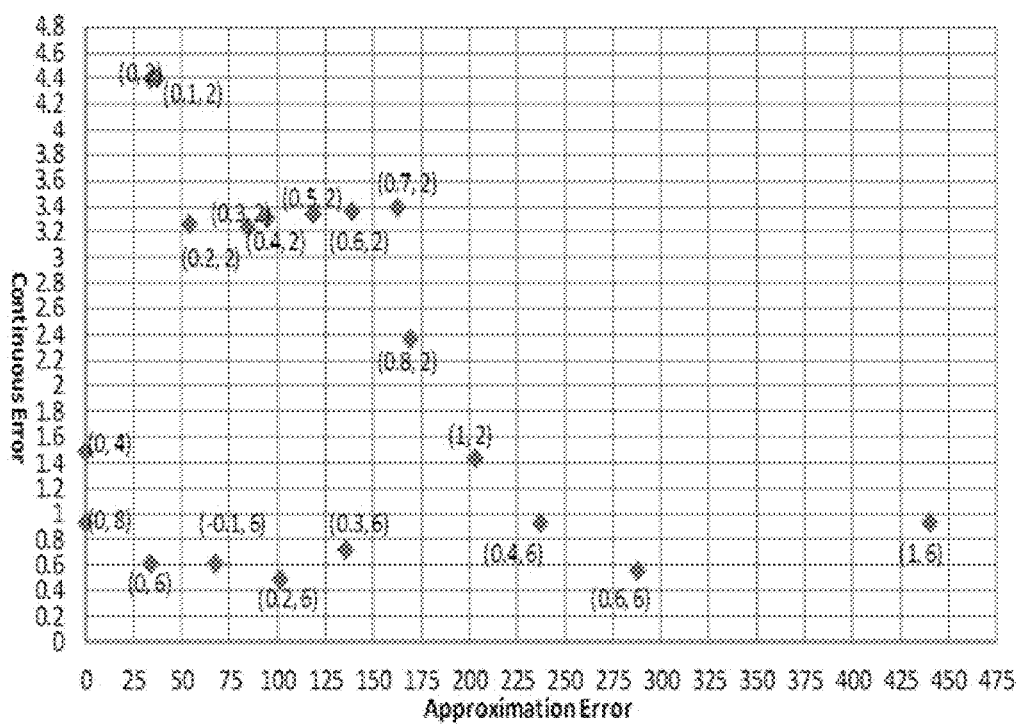
FIG. 13 illustrates an example of errors with different meniscus parameter settings.

FIG. 13 illustrates an example of errors with different meniscus parameter settings.

FIG. 14 illustrates an example of a Greedy algorithm searching for optimal meniscus parameter settings.

Good approximation can be achieved by adjusting the meniscus parameter settings. Therefore, a greedy algorithm for searching the optimal meniscus settings may be applied to solve the problem defined in (9), as described in FIG. 14. The returned solution may be a set of (ki, fi), which means that image #1 was generated based on ki to cure each layer between the ith meniscus area, and image #2 was used to cure the ith meniscus area when the current building layer is at fi layer. The ki may be selected in such a way that with the same meniscus position fi, the weighted error is smallest, that is, given a specific parameter hi in the physical model shown in FIG. 10, image #1 is planned in such a way that the resulted bi makes the formed meniscus profile fit the geometry profile best.

Meniscus Projection Image Calibration and Planning

As shown in FIG. 2, the built part may be raised up above the liquid surface by the stage when the resin related to the desired meniscus shape is cured. Accordingly, the mask image (image₂) that may be used in the meniscus equilibrium approach may be planned by considering the distortions associated with the different Z heights of the desired meniscus shapes. Note the resin surface may be the focus of the projection image. The formed meniscuses after lifting up for a certain Z height may actually be out of focus. To identify a meniscus mask image with controlled exposure for all the meniscuses, projection light modeling and calibration may be first performed. Based on established pixel positions in the topmost and bottom planes, the inverse calculation of the mask image may be presented for any given Z height. Hence, the computed mask image₂ may provide the desired projected light to exactly cover the portion of resin related to the meniscus shape that may located in different Z levels.

Projection Image Modeling and Calibration

Figure 15A:
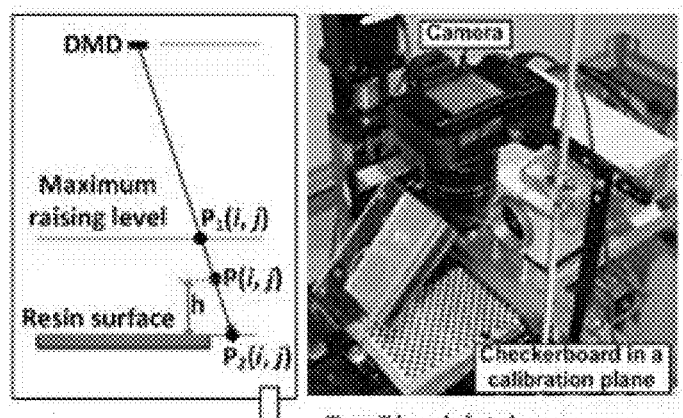
FIGS. 15A-15C illustrate an example of meniscus projection image calibration.

The projection light of each pixel (i, j) may be assumed to be straight within the Z height range in which the formed meniscuses will be located. As shown in FIG. 15A, if $P_1$(i, j) and $P_2$(i, j) on the top and bottom Z planes can be identified, the position P(i, j) for any given Z height can be computed based on the linear interpolation of $P_1$ and $P_2$. The projection image calibration method may be based on the use of a high resolution camera (e.g., Canon SX10) to capture the relative position of a projected checkerboard and a physical checkerboard that is positioned at top and bottom Z levels. Image processing techniques may then be used to build a top and bottom Z level databases, in which, the physical positions of all the pixels on the two calibrated plane are recorded (refer to FIG. 15B). Based on them, a linear interpolation approach can be used in computing the physical position of a pixel in any given plane that is inside the calibration volume.

Figure 15B:
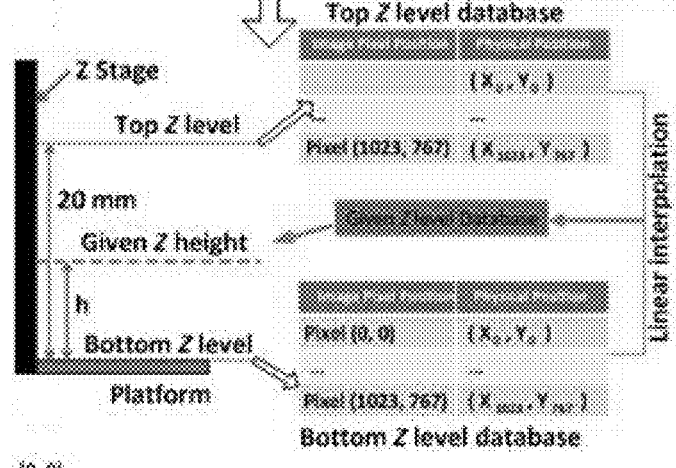
Figure 15C:
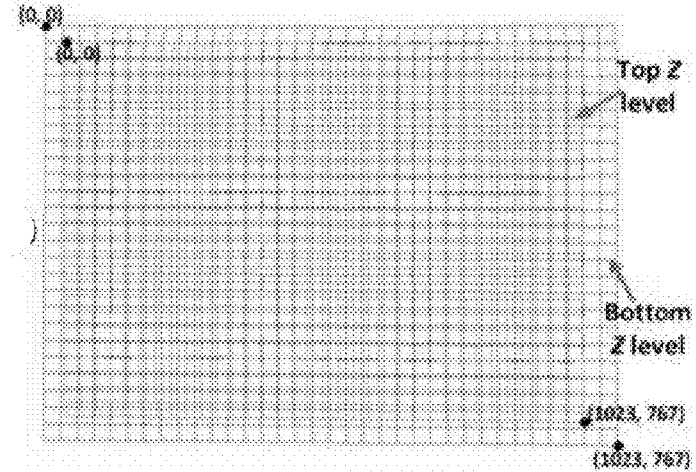

FIGS. 15A-15C illustrate an example of meniscus projection image calibration. FIG. 15C shows calibrated databases in red and blue lines for the top and bottom layers considered in the setup, respectively. The projection results of some intermediate Z levels were also processed, which verified the interpolation results.

Meniscus Projection Image Planning

In the process planning results of a given CAD model, a set of mask image$_1$ and image$_2$ have been computed for each layer of the model (refer to FIG. 9). In addition, a set of meniscus points $P_{hi}$ have been the determined. Based on them, the number of layers between two neighboring meniscus points and the related mask image$_2$ for curing meniscuses related to all the layers are known. Accordingly, a single meniscus projection image can be computed by considering the distortion related to their Z heights. That is, since the platform may be moved upward for a certain height for forming meniscus, the mask image$_2$ in each layer can be converted into a transformed image based on the aforementioned projection calibration results. Finally, all the computed mask images can be combined to form a single projection image for the related meniscus points.

FIGS. 16A-16D illustrates an example of meniscus image planning. FIG. 16A illustrates an input CAD model with related meniscus points. FIG. 16B illustrates meniscus image planning the mask image$_2$ of three sampling layers for curing formed meniscuses in related layers. FIG. 16C illustrates meniscus image planning the mask images of the sampling layers after considering the distortion associated with different Z heights after raising up. FIG. 16D illustrates meniscus image planning the projected mask image$_2$ for curing the meniscuses formed in the first 20 layers.

The FIGS. mask image$_2$ planning process illustrated in 16A-16D MAY BE based on an example similar to the test case as shown in FIG. 18. The CAD model of the test part is shown in FIG. 16A, which is sliced into 76 layers. The meniscus equilibrium method may be applied at layers 20, 40, 60, and 76. Based on the calibration results as shown in FIG. 15, the computed meniscus projection image for the first 20 layers (i.e. $P_{h1}$) is shown in FIG. 16D. The computing results of three individual layers (1$^{st}$, 10$^{th}$, and 20$^{th}$) are also shown in the figure.

Experimental Setup

Figure 17A:
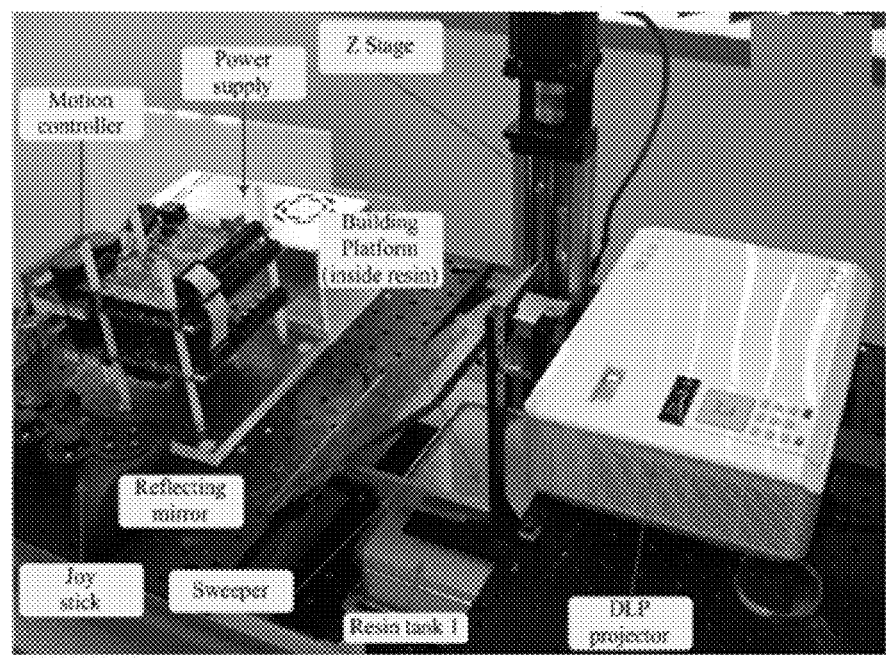
FIGS. 17A-17B illustrate an example of a developed MIP-SL test bed for fabricating smooth surfaces.
Figure 17B:
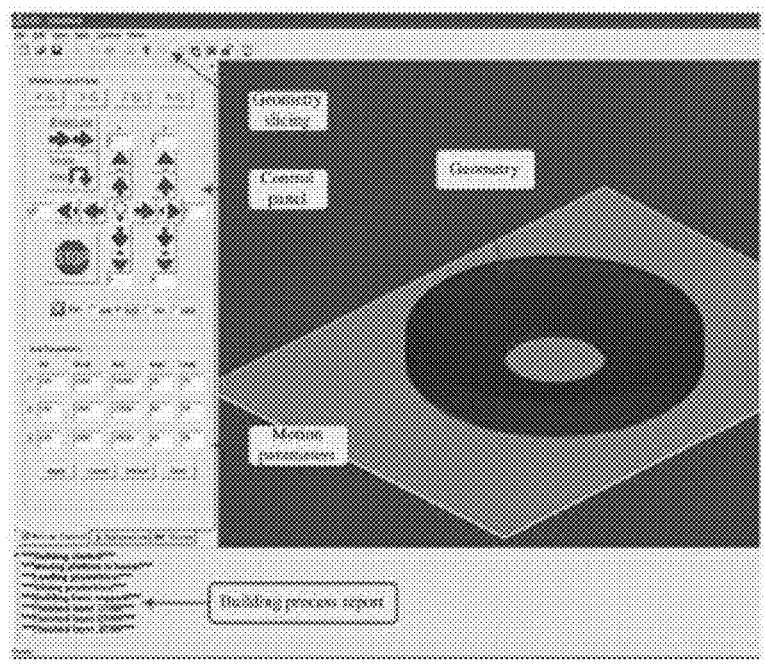

FIGS. 17A-17B illustrate an example of a developed MIP-SL test bed for fabricating smooth surfaces. FIG. 17A illustrates hardware. FIG. 17B illustrates software setups.

A prototype system has been built for verifying the presented methods. The hardware setup of the developed MIP-SL system is shown in FIG. 17A. In the designed system, an off-the-shelf projector (Acer H5360) was used as the projection device. The use of a commercial projector may significantly reduce the prototype cost and simplify the system design. The optical lenses of the projector were modified to reduce the projection distance. Various projection settings including focus, key stone rectification, brightness and contrast were adjusted to achieve a sharp projection image on the designed projection plane. The DMD resolution in the system is 1024×768 and the envelope size is set at 110×82 mm. Two linear motion stages from Thomson Industries Inc (Radford, Va.) are used in the system. One is used as the Z elevator for lifting the build platform; another is used as the sweeper for moving a blade to flatten the resin surface. A high performance 8-axis motion control board KFLOP+SnapAmp 1000 (Dynomotion Inc., Calabasas, Calif.) is used for driving the linear stages.

Commercially available photocurable resin (Perfactory SI500) was used in all the experiments. Other types of liquid that solidify upon exposure to light may be used instead. The exposure time was set at 3 seconds based on the curing depth analysis. A mask image planning and control software system has been developed by using the C++ programming language with Microsoft Visual C++ compiler. The software may be used in the controller that is discussed here. The graphical user interface (GUI) of the developed software system is shown in FIG. 17B. The system can load in a STL model, perform process planning and synchronize the mask image projection with desired linear stage motions. A set of test cases were designed to test the meniscus equilibrium method. The experimental results are presented as follows.

Results and Discussions

Tests on Straight Up-Facing Surfaces

Figure 18A:
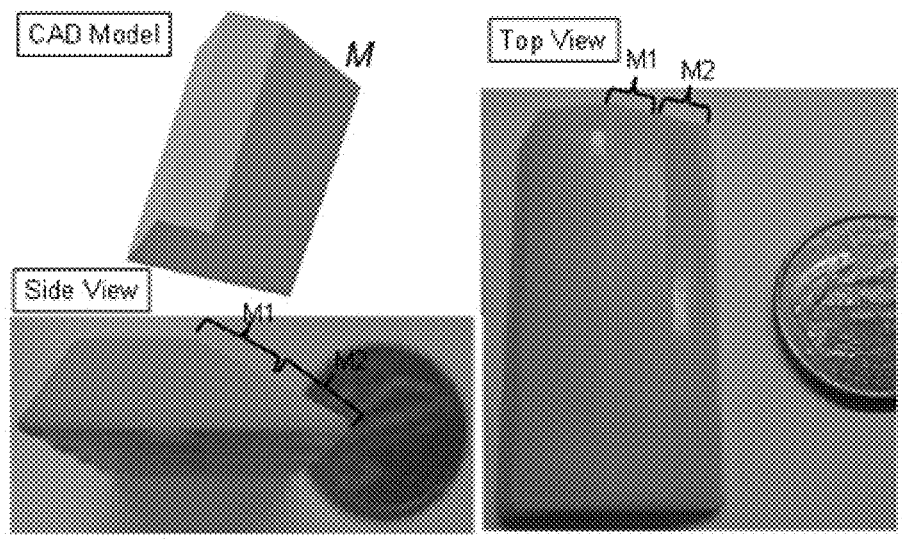
FIGS. 18A-18C illustrate a comparison of an example of a built concave up-facing surface based on different methods.
Figure 18B:
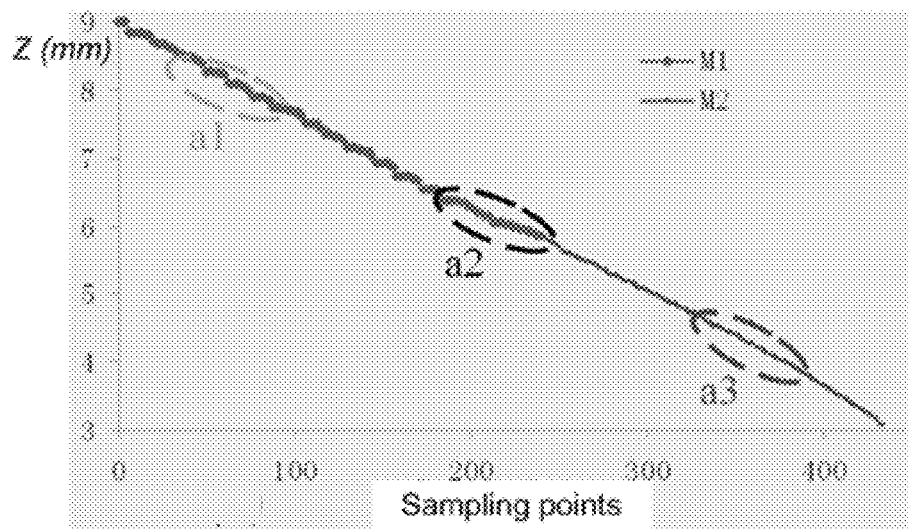
Figure 18C:
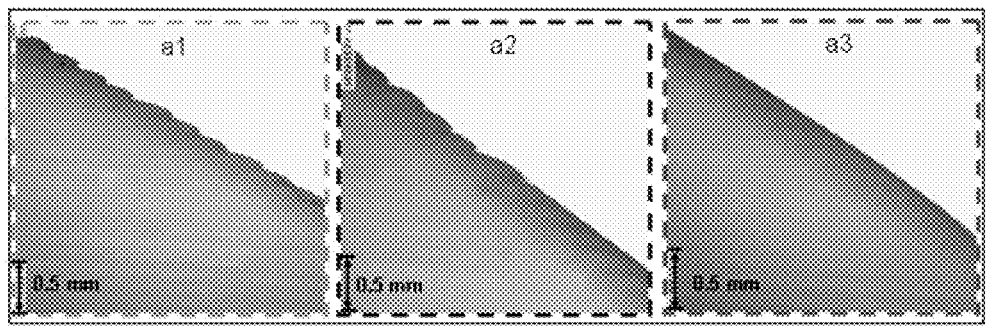

FIGS. 18A-18C illustrate an example of a comparison of built concave up-facing surface based on different methods. FIG. 18A illustrates a CAD model and built part. FIG. 18B illustrates surface measurement results. FIG. 18C illustrates microscopic images of the built surfaces.

As shown in FIG. 18A, a CAD model with a slanted surface M was used in the test. To compare the differences between the traditional and the newly developed methods, the surface M was split into two halves, M1 and M2. The traditional method was used in building the upper half M1, and the meniscus equilibrium method was used in building the bottom half M2. The same layer thickness (0.1 mm) was used in the test. Accordingly a set of mask images was generated by slicing the given CAD model. However, one meniscus point every ten layers was added in set {M} during the process of building M2. That is, after every 10 layers have been built, the built part will be raised up by a certain distance (above the resin surface by 1.5 mm). After waiting for several minutes, the liquid will reach equilibrium. A mask image$_2$ related to the portion of M2 within the built 10 layers is then projected to cure the formed meniscuses. The building result is shown in FIG. 18A. The appearance of the M2 portion is much smoother than that of the M1 portion.

Quantitative measurements have been performed to better understand the surface quality difference. The Z height of a set of uniformly sampled points on M was measured using a digital height gauge with a 0.1 mm probe tip. To automate the measuring process, two motion controlled linear stages from Velmex Inc (Bloomfield, N.Y.) were used. In the measurement setup, the built part was fixed on a linear stage to be translated in the X direction, the control of which may be part of the controller discussed herein. The digital height gauge was fixed on another linear stage to be translated in the Z direction. Every time the probe touches a sampling point on the surface, a height value will be recorded from the digital gauge. To avoid the friction between the probe tip and the slanted surface, the gauge may move away from M in the Z direction first before the part is translated by a small distance in the X direction. The recorded Z height values of the sampling points on surface M are plotted in FIG. 18B. The X axis denotes a set of uniformly spaced sampling points, where '0' denotes the starting point of the measurement and '400' denotes the 400th measuring point. The Z axis denotes the readouts from the digital height gauge. The recorded data of the upper half M1 and the bottom half M2 are plotted using blue and red points respectively. The quantitative comparison shows that the stair-stepping effect of M1 is much greater than that of M2. Three portions, a1, a2 and a3 were marked on the surface as shown in FIG. 18B. They represent M1, the transition between M1 and M2, and M2 respectively.

A precision measurement machine (Sol system from Micro Vu Inc., Windsor, Calif.) was used in taking microscopic images of these three portions. The captured images are shown in FIG. 18C. The measured surface finishes are given in Table 1. The results illustrate that the traditional method may lead to a ragged surface, while the meniscus equilibrium method may effectively eliminate the stair-stepping effect in the MIP-SL process.

TABLE 1

Roughness of the built surfaces in FIG. 18-20.

| | | Roughness measures | | |
|---|---|---|---|---|
| FIG. | Surface | $R_a$ | $R_q$ | $R_z$ |
| FIG. 18 | $M_1$ | 0.028 | 0.034 | 0.120 |
| | $M_2$ | 0.010 | 0.012 | 0.021 |
| FIG. 19 | $M_1$ | 0.031 | 0.038 | 0.118 |
| | $M_2$ | 0.008 | 0.010 | 0.041 |
| FIG. 20 | $M_1$ | 0.027 | 0.033 | 0.090 |
| | $M_2$ | 0.012 | 0.014 | 0.028 |

Tests on Curved Up-Facing Surfaces—Concave Cases

Figure 19A:
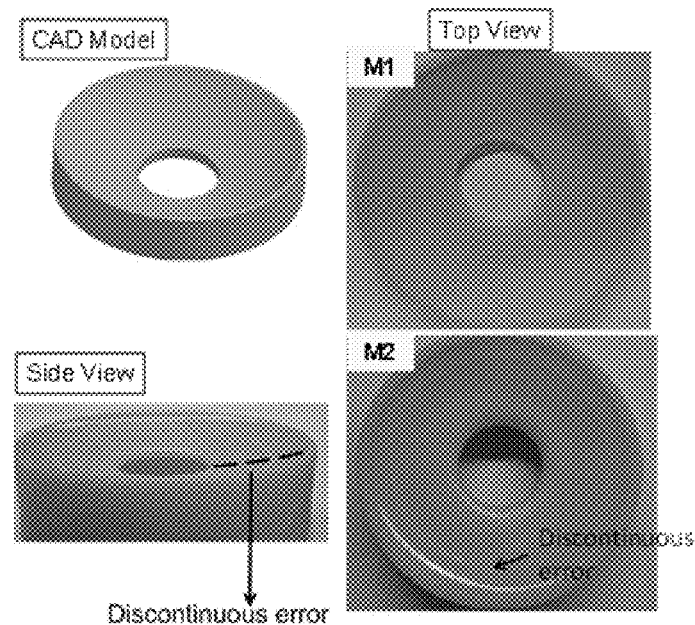
FIGS. 19A-19C illustrate a comparison of an example of a built concave up-facing surface based on different methods.
Figure 19B:
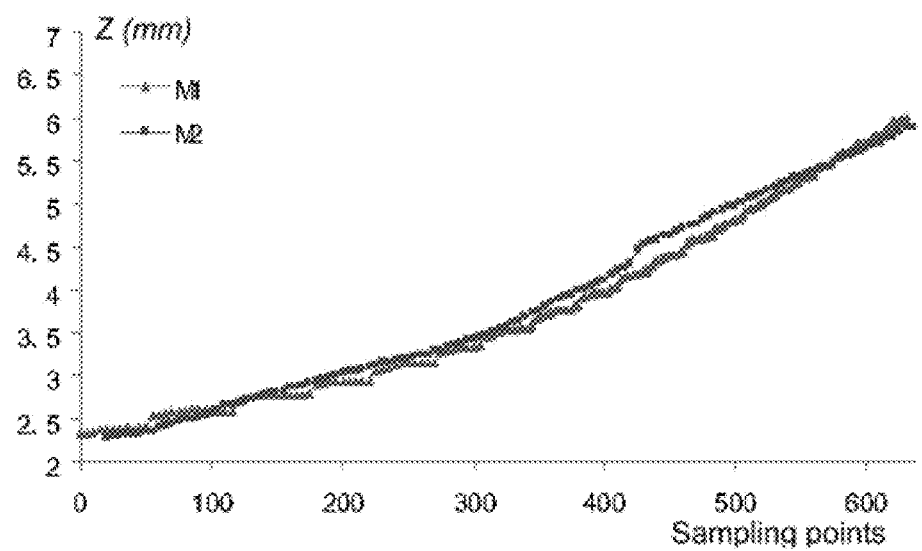
Figure 19C:
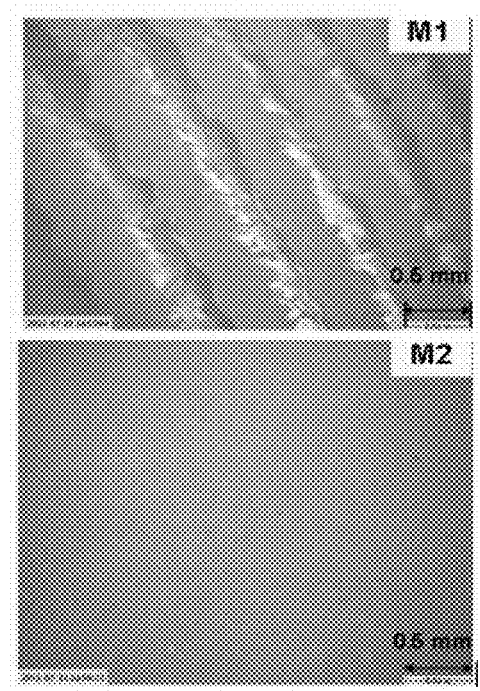

FIGS. 19A-19C illustrate an example of a comparison of built concave up-facing surface based on different methods. FIG. 19A illustrates a CAD model and built part. FIG. 19B illustrates surface measurement results. FIG. 19C illustrates microscopic images of the built surfaces.

As shown in FIG. 19A, a CAD model with a curved surface M was used in the test. The same process parameters were used in the traditional and the newly developed methods for building the CAD model. The related build results $M_1$ and $M_2$ are shown in FIG. 19A. The same measurement procedure as described in Section 7.1 was followed for a quantitative comparison of their surface finishes. The Z height values of the curved up-facing surface are shown in FIG. 19B. The microscopic images of a portion of $M_1$ and $M_2$ are shown in FIG. 19C. The measured surface roughness is given in Table 1.

The test results verify the capability of the meniscus equilibrium method to fabricate smooth concave up-facing surfaces. The given geometry may have an outlet for the liquid resin to flow down to the tank such that meniscuses can be formed.

In the process planning of the meniscus equilibrium method, there may be discontinuous error between neighboring meniscuses, as shown in FIG. 19A. In order to reduce such error, the generated masks $image_1$ and the layers at which $image_2$ are projected may be adjusted.

However, reducing the discontinuous errors may increase the shape approximation error. Hence, a balance between the two types of errors may be considered.

Tests on Curved Up-Facing Surfaces—Convex Cases

Figure 20A:
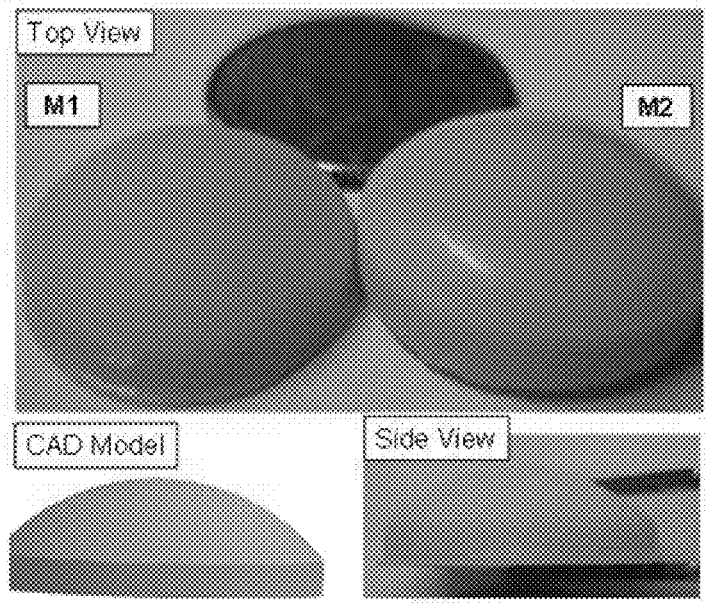
FIGS. 20A-20C illustrate a comparison of an example of a built convex up-facing surface based on different methods.
Figure 20B:
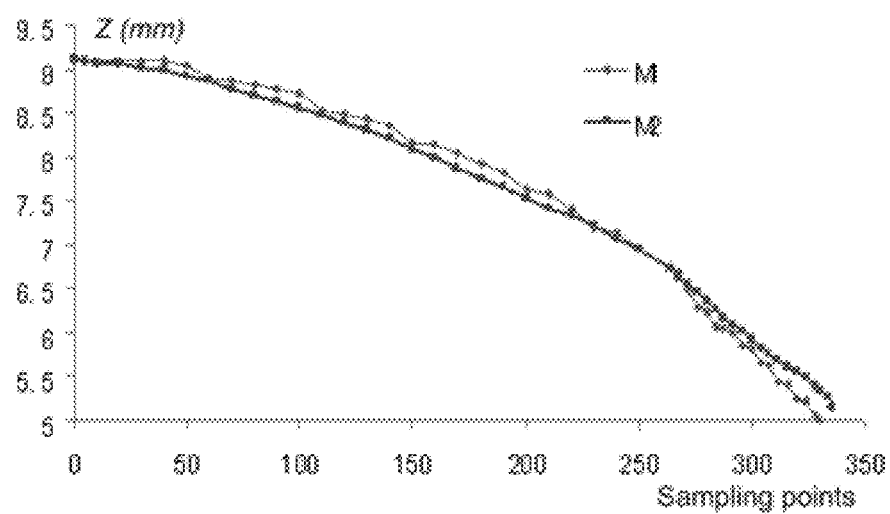
Figure 20C:
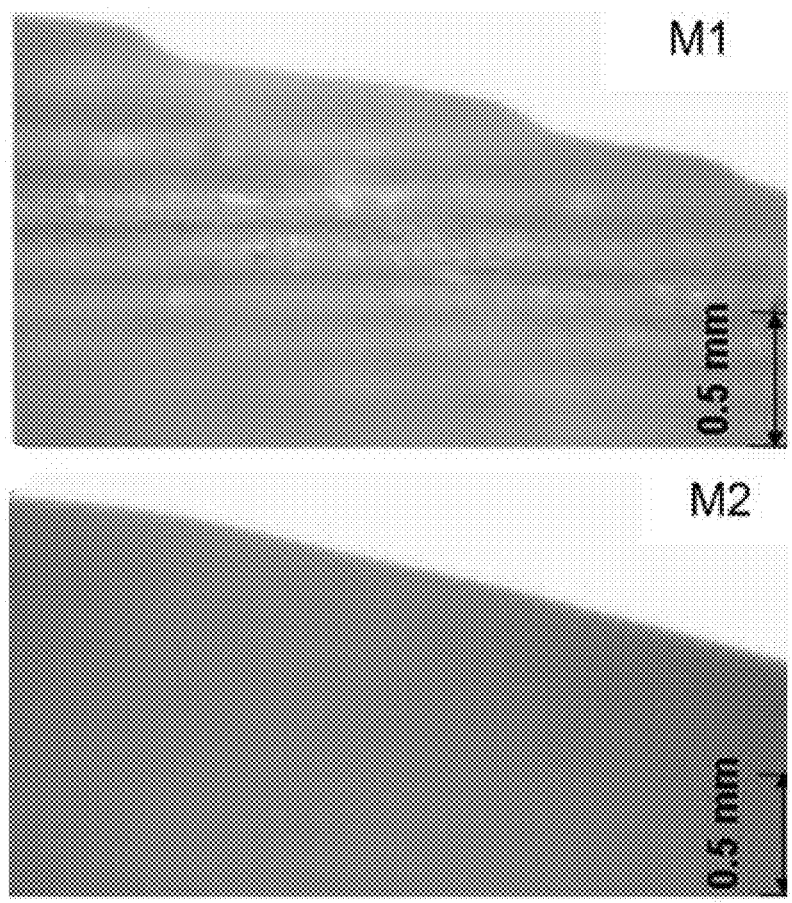

FIGS. 20A-20C illustrate an example of a comparison of the built convex up-facing surface based on different methods. FIG. 20A illustrates a CAD model and built part. FIG. 20B illustrates surface measurement results. FIG. 20C illustrates microscopic images of the built surfaces.

As shown in FIG. 20A, a CAD model with a curved surface M was used in the test. The same process parameters were used in both the traditional and newly developed methods to build the model. The related build results $M_1$ and $M_2$ are shown in FIG. 20A. The same measurement procedure as described above was followed for a quantitative comparison of their surface finishes. The Z height values of the curved up-facing surface are shown in FIG. 20B. The microscopic images of a portion of $M_1$ and $M_2$ are shown in FIG. 20C. The measured surface roughness is given in Table 1. The test results verify the capability of the meniscus equilibrium method to fabricate smooth convex up-facing surfaces.

The profiles of the built surfaces were sampled with surface finishes measured. The computed roughness measures are given in Table 1.

Figure 21:
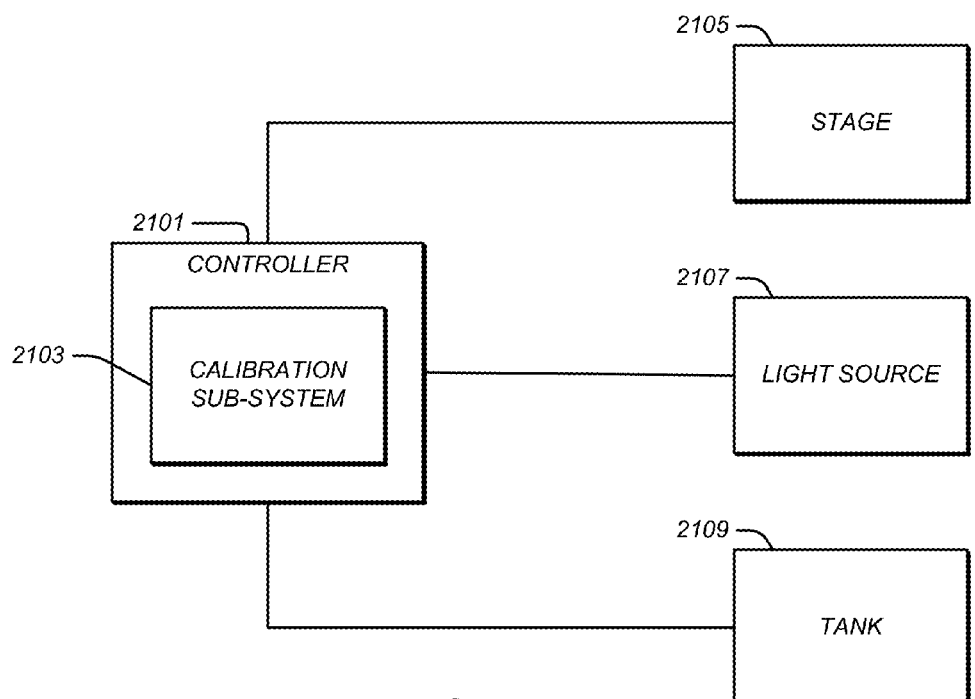
FIG. 21 illustrates an example of a controller that may control a stage, a light source, and/or a tank.

FIG. 21 illustrates a block diagram of an example of a system for producing a desired three dimensional object. Each of these components, as well as variations that they may take, have been described above. By way of summary, the system may include a controller 2101 containing a calibration subsystem 2103, a controllable stage 2105, a controllable light source 2107, and a tank 2109.

The tank 2107 may hold a liquid that solidifies upon exposure to light. The controllable stage 2105 may controllably moves within the tank. The controllable light source 2105 may emit a light image in a controllable pattern. The controller 2101 may control the controllable stage 2105 and the controllable light source 2107 so as to cause at least three cascaded layers to be sequentially solidified in the liquid that collectively approximate at least a section of the desired three dimensional object and that collectively form at least one up-facing step at their outer edges; and, following the solidification of the at least three cascaded layers, cause a meniscus of the liquid to form in the at least one up-facing step; and cause the formed meniscus to solidify in the at least one up-facing step.

The controller 2101 may control the number of sequentially solidified cascaded layers in which the meniscus is formed to cause the outer surface that remains after solidification of the meniscus to substantially conform to the section of the outer surface of the desired three dimensional object.

The controller 2101 may control the width of each of the sequentially solidified cascaded layers in which the meniscus is formed to cause the outer surface that remains after solidification of the meniscus to substantially conform to the section of the outer surface of the desired three dimensional object.

The controller 2101 may control the number and width of the sequentially solidified cascaded layers using a greedy algorithm.

The controller 2101 may control the number and the width of the sequentially solidified cascaded layers using an algorithm derived from one or more simulations of the process.

The calibration subsystem 2103 may allow a user to calibrate a relationship between desired locations of light above a surface of the liquid from the light source with a command signal to the light source that is needed to effectuate illumination at each desired location.

The controller 2101 may include information indicative of the shape of the meniscus, including the shape for each of multiple types of liquid.

The controller 2101 may cause multiple, cascaded layers of meniscus to sequentially form and solidify in the at least one up-facing step.

Figure 22:
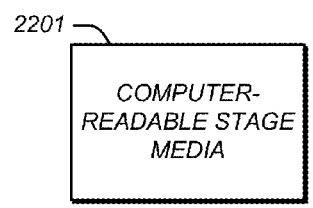
FIG. 22 illustrates an example of a non-transitory, tangible, computer-readable storage medium containing a program of instructions.

FIG. 22 illustrates an example of a non-transitory, tangible, computer-readable storage media containing a program of instructions. The program of instructions may cause a controller running the program of instructions, such a the controller 2101, to provide all or any combination of the control functions discussed herein.

Figure 23:
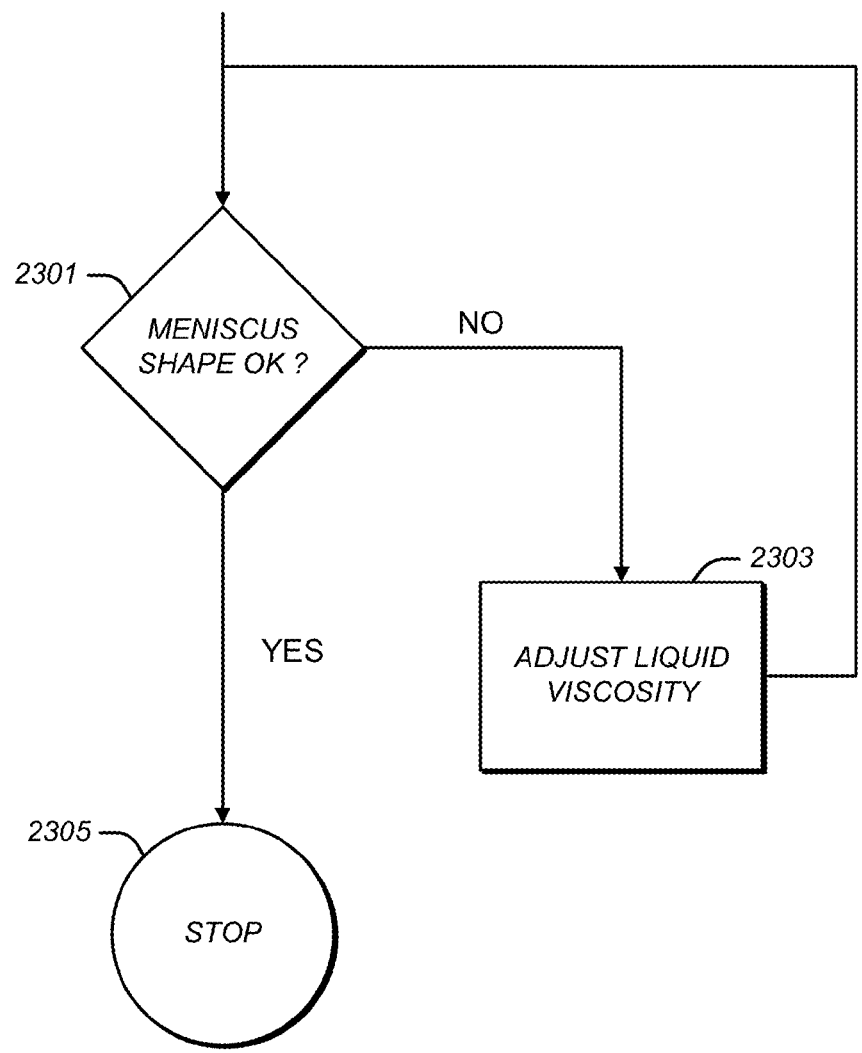
FIG. 23 illustrates an example of a process of producing a desired three dimensional object.

FIG. 23 illustrates an example of a process of producing a desired three dimensional object. The process may check to see whether the shape of a test meniscus has a desired shape, as reflected by a Meniscus shape OK step 2301. If not, the process may adjust the viscosity of the liquid to obtain a meniscus with a different shape, as reflected in an Adjust Liquid Viscosity step 2302, and continue the process until the viscosity produces the desired shape.

Conclusion

This disclosure has presented an approach for building smooth curved surfaces in a mask-image-projection-based stereolithography process. A meniscus equilibrium method has been described for building smooth up-facing surfaces. Based on the developed meniscus models in various scenarios, a process planning problem has been described. A solution strategy based on the greedy heuristic has been described for the process planning of a given CAD model. A calibration and planning approach has also been described for computing meniscus projection images that can accurately cure liquid resin in different Z heights. Experimental tests based on the method have been performed and compared with the traditional method. The differences in the build results illustrate the effectiveness of this method in improving the surface finish of curved surfaces in the MIP-SL process.

The presented method has demonstrated that it is possible to build smooth surfaces without using ultra-thin layers.

The controller that has been discussed herein is implemented with a computer system configured to perform the functions that have been described herein for the controller. The computer system includes one or more processors, tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

The computer system may include one or more computers at the same or different locations. When at different locations, the computers may be configured to communicate with one another through a wired and/or wireless network communication system.

The computer system may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the computer system, as recited herein. The description of each function that is performed by each computer system also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

For example, the same techniques can be used in connection down-facing surfaces by projecting the light bottom-up, instead of top-down during fabrication.

The same techniques can be used in different scale manufacturing, from micro-scale fabrication, to the meso- and macro-scale manufacturing.

The techniques are also not limited in mask image projection based additive manufacturing. They may be applied to any additive manufacturing systems in which a liquid form material is used. They may be used with for different liquids with varying material properties.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A system for producing a three dimensional object comprising:
   a tank that holds a liquid that solidifies upon exposure to light;
   a controllable stage that controllably moves within the tank;
   a controllable light source that emits a light image in a controllable pattern; and
   a controller that controls the controllable stage and the controllable light source based on data indicative of the shape of at least a portion of the three dimensional object so as to cause a series of cascaded layers in the liquid to be formed and solidified to match the appearance of at least a corresponding portion of the three dimensional object and, as part of this, has a configuration that computes one or more of the following so as to cause the at least portion of the finished object to match the at least a corresponding portion of the three dimensional object:
      a number of cascaded layers that should simultaneously have a meniscus of liquid formed and solidified on them; or
      an adjustment to the entire layer thickness of at least one of the cascaded layers.

2. The system of claim 1 wherein the controller computes the number of sequentially solidified cascaded layers in which the meniscus is formed to cause the outer surface that remains after solidification of the meniscus to conform to the section of the outer surface of the three dimensional object.

3. The system of claim 1 wherein the controller computes the width of each of the sequentially solidified cascaded layers in which the meniscus is formed to cause the outer surface that remains after solidification of the meniscus to conform to the section of the outer surface of the three dimensional object.

4. The system of claim 3 wherein the controller computes the number of the sequentially solidified cascaded layers in which the meniscus is formed to cause the outer surface that remains after solidification of the meniscus to conform to the section of the outer surface of the three dimensional object.

5. The system of claim 4 wherein the controller computes the number and width of the sequentially solidified cascaded layers using a greedy algorithm.

6. The system of claim 4 wherein the controller computes the number and the width of the sequentially solidified cascaded layers using an algorithm derived from one or more simulations of the process recited in claim 4.

7. The system of claim 1 wherein the controller includes a calibration subsystem that allows a user to calibrate a relationship between locations of light above a surface of the liquid from the light source with a command signal to the light source that is needed to effectuate illumination at each location.

8. The system of claim 1 wherein the controller includes information indicative of the shape of the meniscus.

9. The system of claim 8 wherein the controller includes information indicative of the shape of the meniscus for each of multiple types of liquid.

10. The system of claim 1 wherein the controller causes multiple, cascaded layers of meniscus to sequentially form and solidify.

11. A non-transitory, tangible, computer-readable storage media containing a program of instructions that cause a controller running the program of instructions to a control a controllable stage that controllably moves within a tank containing a liquid that solidifies upon exposure to light and a controllable light source that emits a light image in a controllable pattern based on data indicative of the shape of at least a portion of a three dimensional object to cause a series of cascaded layers in the liquid to be formed and solidified to match the appearance of at least a corresponding portion of the three dimensional object and, as part of this, to compute one or more of the following so as to cause the at least portion of the finished object to match the at least corresponding portion of the three dimensional object:
    a number of cascaded layers that should simultaneously have a meniscus of liquid formed and solidified on them; or
    an adjustment to the entire layer thickness of at least one of the cascaded layers.

12. The storage media of claim 11 wherein the program of instructions cause the controller to compute the number of sequentially solidified cascaded layers in which the meniscus is formed to cause the outer surface that remains after solidification of the meniscus to conform to the section of the outer surface of the three dimensional object.

13. The storage media of claim 11 wherein the program of instructions cause the controller to compute the width of each of the sequentially solidified cascaded layers in which the meniscus is formed to cause the outer surface that remains after solidification of the meniscus to conform to the section of the outer surface of the three dimensional object.

14. The storage media of claim 13 wherein the program of instructions cause the controller to compute the number of the sequentially solidified cascaded layers in which the meniscus is formed to cause the outer surface that remains after solidification of the meniscus to conform to the section of the outer surface of the three dimensional object.

15. The storage media of claim 14 wherein the program of instructions cause the controller to compute the number and width of the sequentially solidified cascaded layers using a greedy algorithm.

16. The storage media of claim 14 wherein the program of instructions cause the controller to compute the number and the width of the sequentially solidified cascaded layers using an algorithm derived from one or more simulations of the process recited in claim 14.

17. The storage media of claim 11 wherein the program of instructions cause the controller to allow a user to calibrate a relationship between locations of light above a surface of the liquid from the light source with a command signal to the light source that is needed to effectuate illumination at each location.

18. The storage media of claim 11 wherein the program of instructions cause the controller to include information indicative of the shape of the meniscus.

19. The storage media of claim 18 wherein the program of instructions cause the controller to include information indicative of the shape of the meniscus for each of multiple types of liquid.

20. The storage media of claim 11 wherein the program of instructions cause the controller to cause multiple, cascaded layers of meniscus to sequentially form and solidify.

21. A process of producing a three dimensional object using the system of claim 1 in which the viscosity of the liquid is adjusted to cause the meniscus to have a shape.

* * * * *